(12) United States Patent
Passarotto et al.

(10) Patent No.: US 8,007,052 B2
(45) Date of Patent: Aug. 30, 2011

(54) RIM FOR A SPOKED BICYCLE WHEEL, WHEEL AND MANUFACTURING METHOD

(75) Inventors: Maurizio Passarotto, Rovigo (IT); Davide Urbani, Montecchio Maggiore (IT)

(73) Assignee: Campagnolo, S.R.L., Vicena (IT)

( * ) Notice: Subject to any disclaimer, the term of this patent is extended or adjusted under 35 U.S.C. 154(b) by 225 days.

(21) Appl. No.: 11/216,611

(22) Filed: Aug. 31, 2005

(65) Prior Publication Data

US 2006/0043784 A1   Mar. 2, 2006

(30) Foreign Application Priority Data

Aug. 31, 2004   (EP) .................................. 04425653

(51) Int. Cl.
*B60B 21/06* (2006.01)
(52) U.S. Cl. ............. 301/5.21; 301/95.101; 301/95.104
(58) Field of Classification Search ............... 301/5.21, 301/5.22, 30, 31, 33, 95.101, 95.104, 95.105, 301/95.106, 95.107, 95.108, 65
See application file for complete search history.

(56) References Cited

U.S. PATENT DOCUMENTS

| | | | | |
|---|---|---|---|---|
| 531,914 | A * | 1/1895 | Donnelly | 301/6.1 |
| 707,335 | A * | 8/1902 | Kenyon | 295/6 |
| 1,377,173 | A * | 5/1921 | Luean | 301/33 |
| RE15,366 | E * | 5/1922 | Dressel | 301/31 |
| 1,484,844 | A * | 2/1924 | Olle | 301/95.108 |
| 1,542,630 | A * | 6/1925 | Meredith | 301/33 |
| 1,667,344 | A * | 4/1928 | Couture | 301/5.21 |
| 1,684,290 | A * | 9/1928 | Starling | 301/5.21 |
| 1,833,879 | A * | 11/1931 | Ash | 301/5.21 |
| 1,847,774 | A * | 3/1932 | Main et al. | 301/5.21 |
| 1,889,577 | A * | 11/1932 | Tibbetts | 301/5.21 |
| 2,840,133 | A | 6/1958 | Billingsley | |
| 2,937,905 | A | 5/1960 | Altenburger | |
| 3,253,862 | A * | 5/1966 | Watanabe et al. | 301/65 |
| 4,153,267 | A * | 5/1979 | Hilber | 280/281.1 |
| 4,181,365 | A * | 1/1980 | Kawaguchi et al. | 301/67 |
| 5,271,663 | A * | 12/1993 | Maldini et al. | 301/5.22 |
| 5,603,553 | A | 2/1997 | Klieber et al. | |
| 5,653,510 | A * | 8/1997 | Osborne | 301/30 |
| 6,024,413 | A * | 2/2000 | Dixon et al. | 301/58 |
| 6,048,035 | A * | 4/2000 | Chen | 301/30 |
| 6,155,651 | A * | 12/2000 | Mizata et al. | 301/95.104 |
| 6,183,047 | B1 * | 2/2001 | Kuhl | 301/95.106 |
| 6,196,638 | B1 * | 3/2001 | Mizuno et al. | 301/104 |
| 6,378,953 | B2 * | 4/2002 | Mercat et al. | 301/95.106 |
| 6,402,256 | B1 | 6/2002 | Mercat | |

(Continued)

FOREIGN PATENT DOCUMENTS

EP   0579525   1/1994

(Continued)

OTHER PUBLICATIONS

English translation of Jul. 13, 2010 Office Action in corresponding Japanese Application No. 2005-251583.

(Continued)

*Primary Examiner* — Russell D Stormer
(74) *Attorney, Agent, or Firm* — Volpe and Koenig, P.C.

(57) ABSTRACT

A spoked bicycle wheel is presented having at least one intraspoke zone with a reduced average wall thickness to reduce or eliminate the dynamic imbalance of the wheel resulting from localized mass increases at the valve and at a possible joint.

48 Claims, 18 Drawing Sheets

U.S. PATENT DOCUMENTS

| | | |
|---|---|---|
| 6,761,847 B2 | 7/2004 | Meggiolan |
| 6,783,192 B2 | 8/2004 | Meggiolan |
| 2002/0066316 A1 | 6/2002 | Kashiwai et al. |
| 2002/0067066 A1 | 6/2002 | Kashiwai et al. |
| 2005/0017569 A1 | 1/2005 | Passarotto |

FOREIGN PATENT DOCUMENTS

| | | |
|---|---|---|
| EP | 0 715 001 A1 | 6/1996 |
| EP | 1 084 868 A1 | 3/2001 |
| EP | 0 936 085 A3 | 10/2001 |
| EP | 1 231 077 A2 | 8/2002 |
| EP | 1 314 579 A2 | 5/2003 |
| EP | 1 314 579 A3 | 5/2003 |
| FR | 657185 | 5/1929 |
| JP | 329153 | 7/1955 |
| JP | 5125421 | 6/1976 |
| JP | 62-119639 | 7/1987 |
| JP | 63031802 | 2/1988 |
| JP | 04306101 | 10/1992 |
| JP | 07-117423 | 5/1995 |
| JP | 3025849 | 10/1996 |
| JP | 2002166702 | 11/2002 |
| JP | 2003-098027 | 4/2003 |
| JP | 2003094902 | 4/2003 |
| TW | 497556 Y | 8/2002 |
| TW | 505113 Y | 10/2002 |

OTHER PUBLICATIONS

English translation of Apr. 20, 2011 Office Action issued in corresponding Taiwanese Appln. No. 094129965.

May 10, 2011 Office Action issued in corresponding Japanese Appln. No. 2005-251583.

English translation of May 10, 2011 Office Action issued in corresponding Japanese Appln. No. 2005-251583.

Campagnolo Products Catalogue 2005, pp. 92-97.

\* cited by examiner

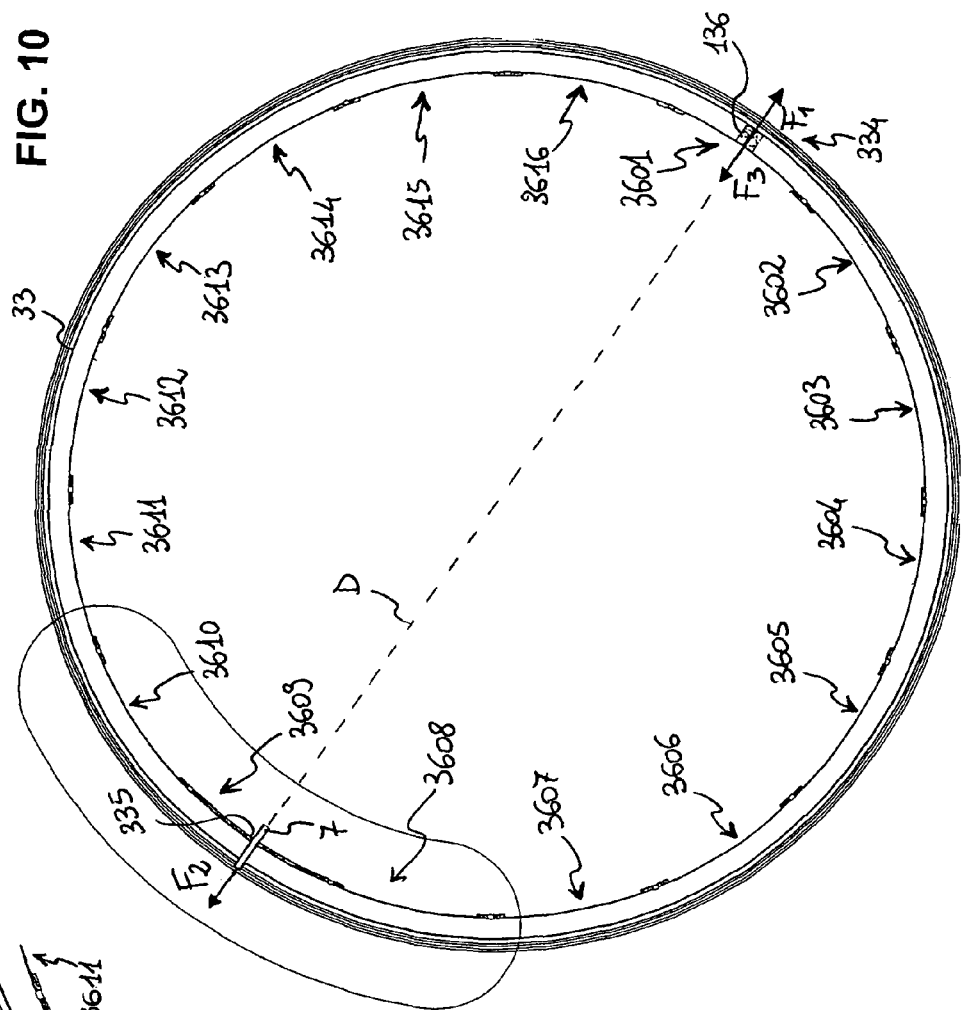

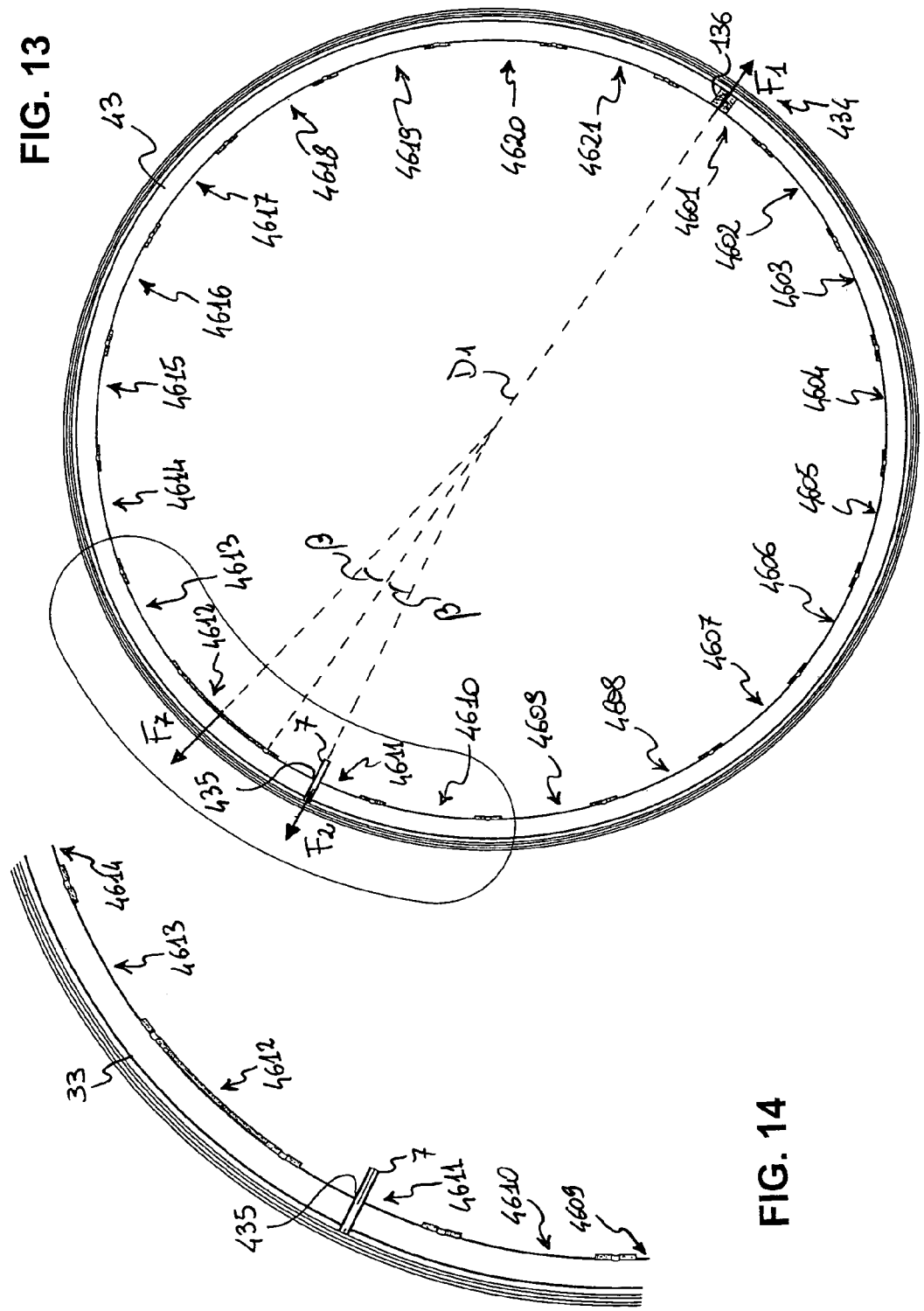

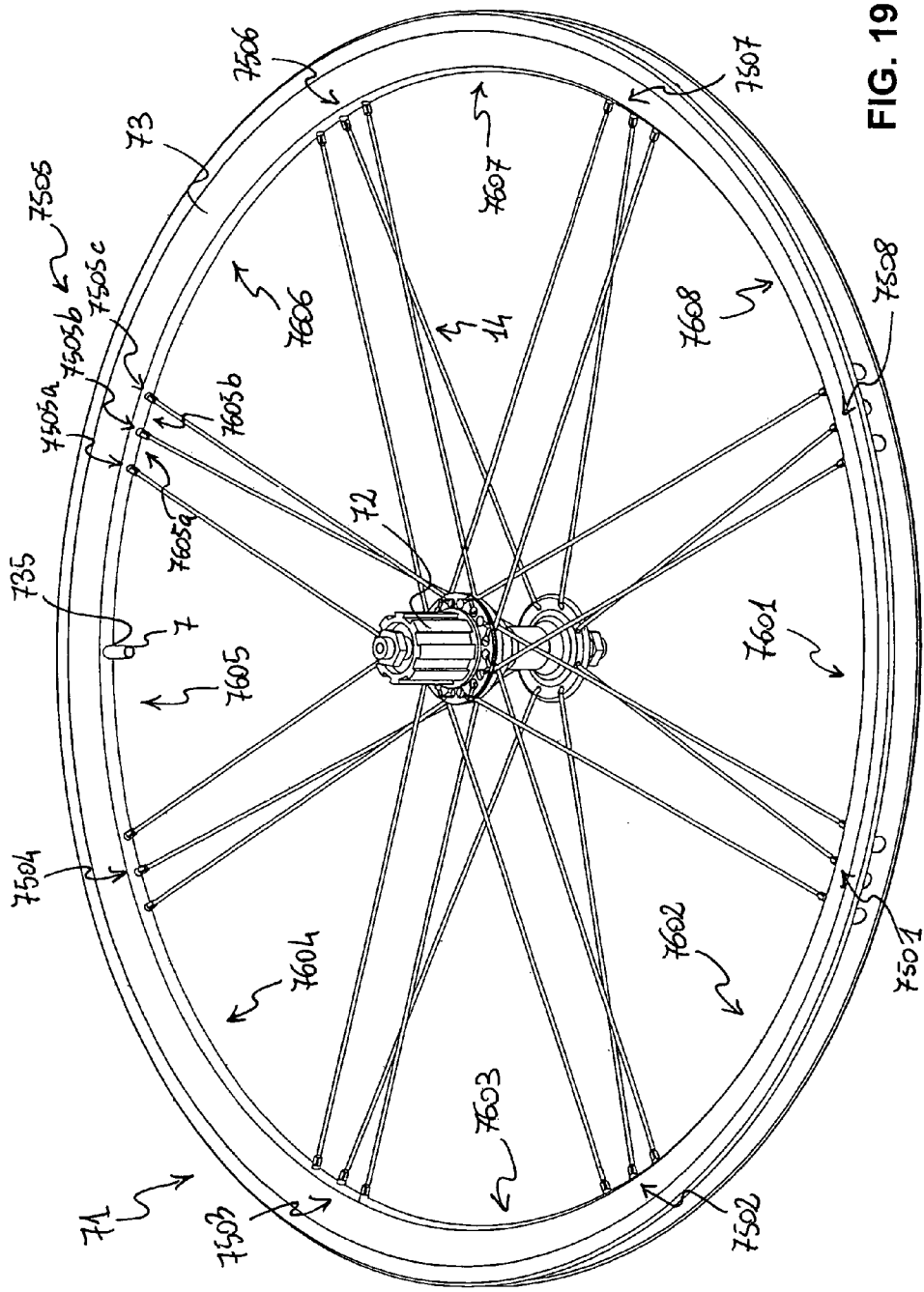

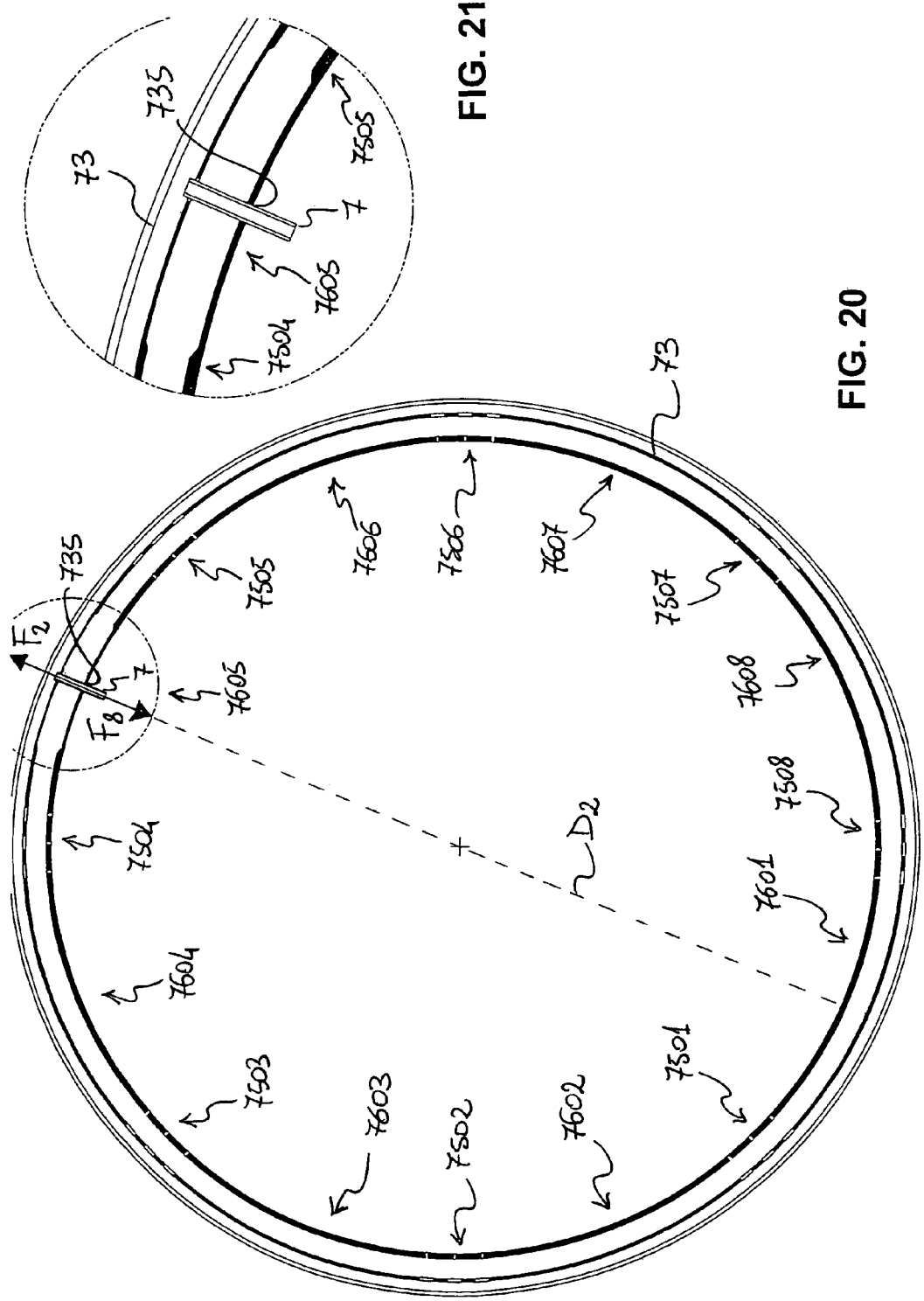

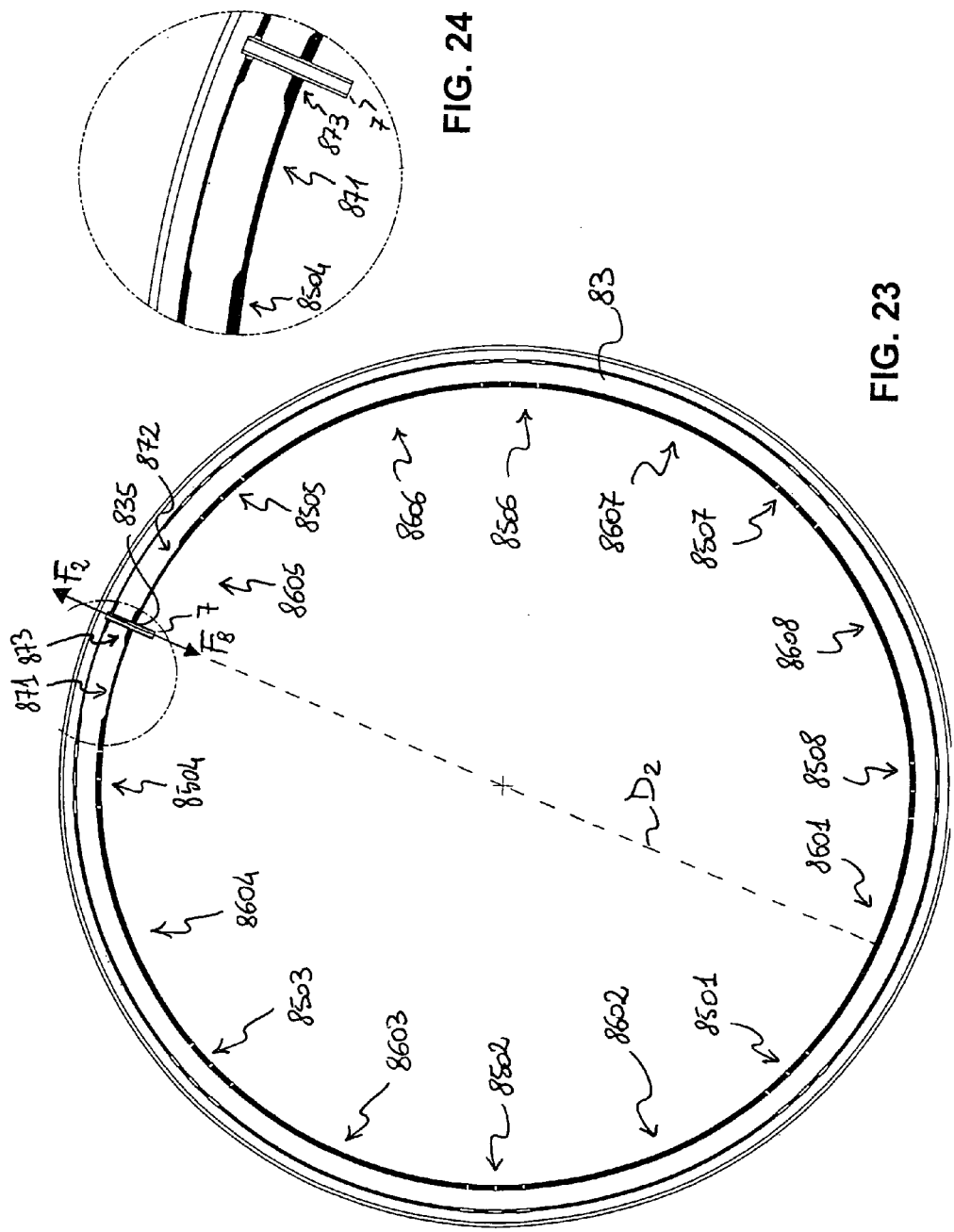

RIM FOR A SPOKED BICYCLE WHEEL, WHEEL AND MANUFACTURING METHOD

FIELD OF THE INVENTION

The present invention concerns, in general, the field of spoked bicycle wheels, and in particular a rim for a spoked bicycle wheel, a spoked wheel comprising such a rim and a method for manufacturing a rim for spoked bicycle wheels.

BACKGROUND

A spoked bicycle wheel conventionally comprises a rim, a hub and a set of spoke connections between the rim and the hub.

More specifically, for the connection between rim and hub, a spoke having a widened head at a first end, and an outer threading at a second end opposite the first end is typically provided.

The widened head of the spoke is received in a suitably shaped seat, usually made at the hub or at a flange thereof. In order to allow the extension of the spoke in the radial or substantially radial direction, a bend is typically provided close to the first end of the spoke. The bend of the spoke at the first end can, however, be left out.

The threading at the second end of the spoke is coupled in a threaded hole usually made at the rim or, preferably, in a removable connection element of the nipple type or nut type, which abuts at seating holes in the rim, possibly through the interposition of a plate.

Spokes with different attachment means to the rim and to the hub are also known, for example where the head of the spoke is intended to couple with the rim, and the threading of the spoke is intended to couple with the hub. The present invention is not limited to any particular type of spoke connection.

In the present invention and in the attached claims, the expression "spoke connection" is meant to indicate the set of a spoke and possible removable connection elements, such as the aforementioned nipple and interposition plate.

The hub is an element with rotational symmetry with respect to the axis of the bicycle wheel, and the spoke connections are always so distributed along the circumference of the wheel that the center of mass of them as a whole is at the axis of the wheel. More specifically, the spoke connections can be distributed equally spaced apart, or can be distributed equally spaced apart along the rim in groups of two or more spoke connections.

Due to the different angle of the spoke connections with respect to the median plane of the wheel (camber) between one side and the other of the hub and/or due to a tangential attachment of the spokes to a side of the hub and/or for other reasons in particularly complex spoke patterns, there can be spoke connections of varying masses, but still forming regular, with respect to the rotation axis, sub-sets of identical spoke connections. Also in such cases, the center of mass of the set of spoke connections is therefore at the rotation axis of the wheel, in other words the set of spoke connections is balanced with respect to the rotation axis.

It is known to make rims with a low wall thickness in all of the zones between the spokes, or at least in all of the zones between groups of spokes that are close together, in order to contain the weight of the rim while still offering adequate structural strength along the whole rim.

The known geometries of the rims are such that also the rim is an element with rotational symmetry with respect to the axis of the wheel.

At first view, the wheel is therefore dynamically balanced.

In practice, however, there is always a cause for an imbalance or a mass discontinuity, in particular a localized mass increase, caused by the valve that retains the air inside the pneumatic tire, be it of the type with an inner tube, of the tubeless type or of the type with a tubular tire. The valve, fixed in a proper hole formed in the rim, is typically made of brass and has standard dimensions and therefore predetermined weight. The slight lightening of the rim as a result of the housing hole provided for the valve is insufficient to compensate for the localized mass increase of the valve itself. On the contrary, in rims obtained by carbon fiber molding, the localized mass increase at the valve is sometimes accompanied by a further increase in mass due to the presence of a greater thickness of the rim in such a zone in order to compensate for the weakening of the rim due to the hole for the valve.

The cause for imbalance provided by the valve is accompanied, in the case of metal rims, by a second cause. Metal rims, in particular those made of steel or aluminum alloy, are made through a rod extruded according to the desired section of the rim, said rod then being shaped into a circumference by calendaring. The jointing of the ends of the rod is carried out in various ways, all of which however provide for the addition of material and therefore determine a localized mass increase. For example, known methods for carrying out jointing provide for: the insertion with interference of one or more pins in respective holes butt formed in the wall of the ends of the extruded rod; the insertion of a sleeve in an inner chamber of the extruded rod for a certain extent from both ends, possibly with the addition of an adhesive; and the butt welding of the ends, carried out with or without addition of welding material, but in any case using solid metal inserts in the inner chamber of the extruded rod in order to allow for the gripping of the ends with suitable pincers during welding without the risk of deforming the rim.

One or both of the causes for localized mass increase bring about that the center of mass of the masses does not belong to the rotation axis of the wheel. From a dynamic point of view, the imbalance caused by such localized mass increases brings about an unfavorable instability of the wheel. Moreover, given that the imbalance increases as the speed of the wheel increases, it becomes more dangerous precisely when a very stable wheel is needed, i.e., when the travel speed is fast, like when going downhill.

In the case of metal rims, to reduce the problem of dynamic imbalance, it is known to make the hole for the valve in a position diametrically opposite the joint of the extruded rod. The balancing of the masses in movement thus obtained is, however, insufficient to provide good stability of the wheel since typically the additional mass in the zone of the joint is different from, normally greater than, the mass of the valve body. Moreover, in the case of wheels with odd spoke patterns, it is sometimes not possible to make the hole for the valve in a position diametrically opposite the joint of the extruded rod, but only in an approximately opposite position since the diametrically opposite position is occupied by a spoke or by a group of spokes. The resultant of the forces cannot, therefore, be cancelled out due to the aforementioned mass difference and/or due to the angle that the centrifugal forces due to the two localized mass increases form between them.

It has also been attempted to solve the problem of balancing in such rims by sticking a plate at the valve hole. By providing for an additional element, such a provision is however unsatisfactory both from the manufacture point of view and from the point of view of the end product, since, besides increasing the weight of the rim, the plate risks detaching with the use of the bicycle, is unaesthetic and not aerodynamic.

The technical problem at the basis of the present invention is to effectively reduce the dynamic imbalance of a bicycle wheel.

SUMMARY

The technical problem outlined above is solved, according to the invention, by a rim of a spoked bicycle wheel comprising spoke attachment zones and intraspoke zones, where the intraspoke zones have varying average wall thickness and are distributed to at least partially compensate for at least one localized mass increase of the wheel.

BRIEF DESCRIPTION OF THE DRAWINGS

The invention shall be better described hereafter with reference to some embodiments and examples, based upon the attached drawings, wherein corresponding elements are designated by similar numbers. In the drawings:

FIGS. 9 and 10 are perspective and section views respectively, of a third embodiment, FIG. 11 is a magnified view of a portion of the rim of FIG. 10, FIGS. 12 and 13 are perspective and section views respectively, of a fourth embodiment, FIG. 14 is a magnified view of a portion of the rim of FIG. 13, FIGS. 15 and 16 are perspective and section views respectively, of a fifth embodiment, FIGS. 19 and 20 are perspective and section views respectively, of a seventh embodiment, FIG. 21 is a magnified view of a portion of the rim of FIG. 20, FIGS. 22 and 23 are perspective and section views respectively, of an eighth embodiment, and FIG. 24 is a magnified view of a portion of the rim of FIG. 23.

DETAILED DESCRIPTION OF THE PREFERRED EMBODIMENTS

Introduction to the Embodiments

Figure 1:
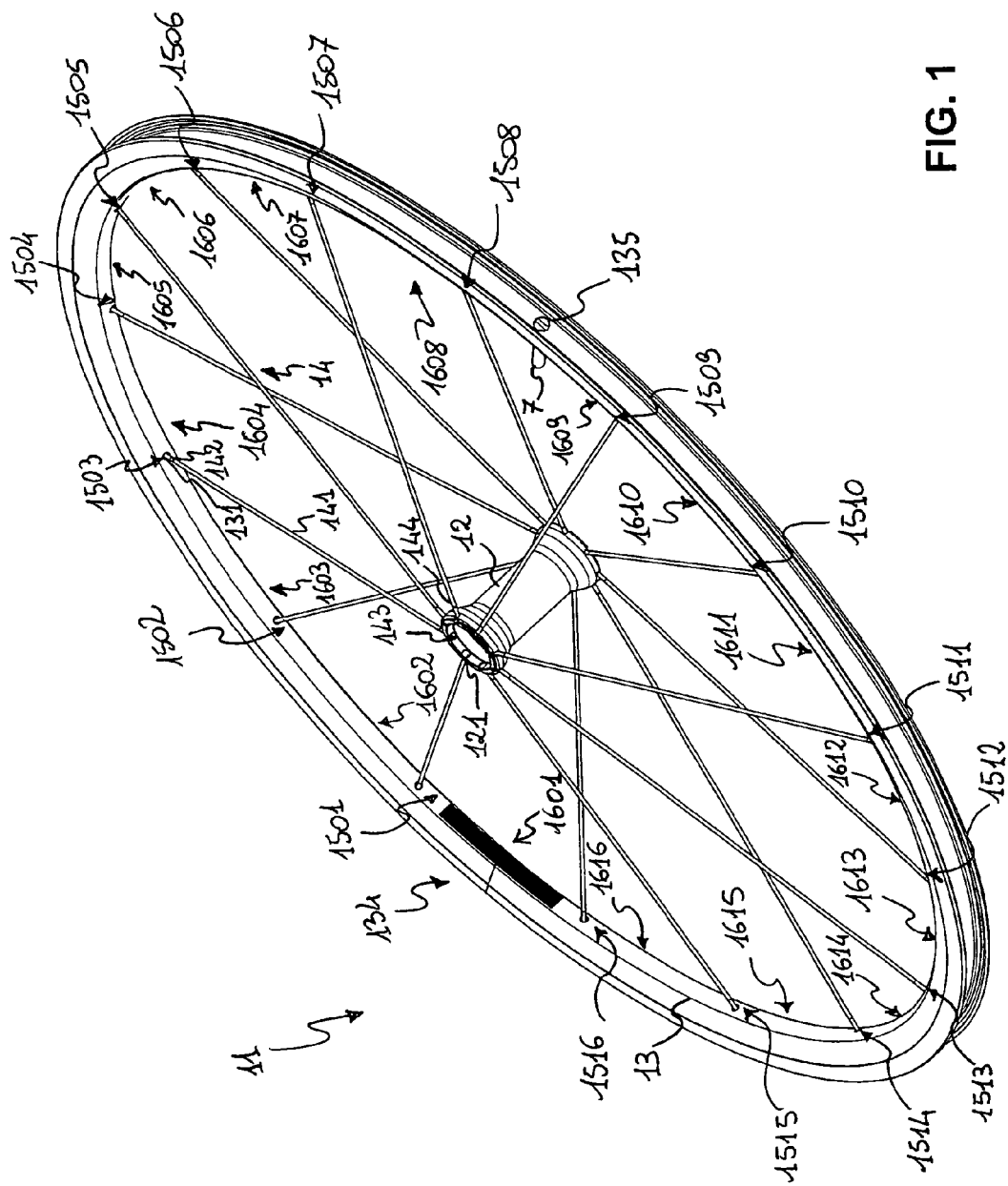
FIG. 1 is a perspective view of a wheel according to a first embodiment of the invention.

The invention, in a first aspect thereof, concerns a rim of a bicycle spoked wheel, comprising spoke attachment zones and intraspoke zones, characterized in that said intraspoke zones comprise a first sub-set of intraspoke zones having a first average wall thickness and a second sub-set of intraspoke zones, each intraspoke zone of the second sub-set having a smaller average wall thickness than said first average wall thickness, said intraspoke zones of the second sub-set being distributed to at least partially compensate for at least one localized mass increase of the wheel.

In the present description and in the attached claims, average wall thickness means the volume of material of the rim in the zone, divided by the length of the zone.

The localized mass increases of the wheel can comprise a valve insertable within a housing hole of the rim and/or a jointing zone of the rim.

The second sub-set, i.e. zones of comparatively low thickness, can comprise an intraspoke zone comprising a first position having a first localized mass increase.

Alternatively or in addition, the second sub-set can comprise at least one pair of intraspoke zones arranged symmetrically about said first position, in a half of the rim centered about the first position.

The above also applies in the case in which there is also a second localized mass increase, less than said first localized mass increase and arranged at a second position in an intraspoke zone that is substantially diametrically opposite the first position. The two localized mass increases can, indeed, partially compensate each other. Moreover, small deviations from positions exactly diametrically opposite can be taken into account with an asymmetric progression of the wall thickness of the zone(s) of the second sub-set used for compensation or partial compensation.

When there are a first localized mass increase at a first position and a second localized mass increase, less than said first localized mass increase and arranged at a second position in an intraspoke zone that is not diametrically opposite the first position, said second sub-set can comprise an intraspoke zone arranged on the same side with respect to the second position with respect to the diameter passing through the first position and in the same half of the rim as the first position.

In particular, the second sub-set can comprise the intraspoke zone closest to the first position that is of the same extent as the intraspoke zone comprising said first localized mass increase.

This can, in the case of uniform distribution of the spokes, be the intraspoke zone arranged adjacent to the first position.

In other embodiments, when there are a first localized mass increase at a first position and a second localized mass increase, less than said first localized mass increase and arranged at a second position, the two localized mass increases can be compensated for separately, also in the case in which the first and second localized mass increases are diametrically opposite or substantially opposite. In certain cases it may be preferable, to minimize the weight of the rim, to reduce both of the zones involved by the localized mass increases, each by a mass corresponding to the localized mass increase located within it.

For example, the second sub-set can comprise an intraspoke zone that comprises the first position and an intraspoke zone that comprises the second position.

Alternatively or in addition, the second sub-set can comprise at least one pair of intraspoke zones symmetrically arranged about said first position, in the half of the rim centered about the first position, and at least one pair of intraspoke zones symmetrically arranged about said second position, in the half of the rim centered about the second position.

In order to create an advantageously light rim, in the various embodiments the second sub-set can further comprise at least one group of intraspoke zones, the group being balanced with respect to the axis of the rim and therefore being neutral with respect to the compensation of the localized mass increases.

In particular, said group of zones can comprise one or more pairs of diametrically opposite intraspoke zones.

In case there are intraspoke zones with different extents (or lengths along the rim), like for example in the case of spoke patterns having groups of spokes, those of the second sub-set can all have the same or a different extent.

Certain embodiments are advantageous since they minimize material-removal working to reduce the thickness of the intraspoke zones of the second sub-set and/or maximize the structural strength of the rim. In such embodiments, the second sub-set consists of 1 or 2 intraspoke zones.

On the other hand, to minimize the weight of the rim, it may be advantageous for said second sub-set to comprise all of the intraspoke zones except for 1 or 2. The second subset can also comprise all of the intraspoke zones arranged between groupings of spokes, except for 1 or 2.

The intraspoke zones of the second sub-set can have the same average wall thickness, but this is not essential.

The geometry of the intraspoke zones of the second sub-set can be of various types.

For example, each intraspoke zone of the second sub-set can have a symmetric or an asymmetric mass distribution.

Moreover, in each intraspoke zone of the second sub-set, the transitions from the thickness of the adjacent spoke attachment zones can be abrupt or develop along a certain length of the rim.

The reduction in average wall thickness of the intraspoke zones of the second sub-set can be carried out in one or more of the walls of the rim, for example in the one facing towards its center, commonly named the lower bridge.

In order to allow the lightening necessary for compensation while still preserving an adequate structural strength, when the second sub-set comprises an intraspoke zone that comprises a hole for a valve, such a zone can have a central region comprising the valve hole and two end regions, the central region having a greater wall thickness than the end regions.

The intraspoke zones of the first sub-set, i.e. the comparably thick ones, can have an average wall thickness equal to an average wall thickness of the spoke attachment zones, which is typically the maximum thickness of the rim.

In a second aspect thereof, the invention concerns a spoked bicycle wheel comprising a rim as outlined above.

In a third aspect thereof, the invention concerns a method of manufacturing a rim of a spoked bicycle wheel, comprising the step of forming a rim having spoke attachment zones and intraspoke zones, wherein a first sub-set of said intraspoke zones are formed with a first average wall thickness and a second sub-set of intraspoke zones are formed each with an average wall thickness less than the first average wall thickness, said intraspoke zones of the second sub-set being distributed to at least partially compensate for at least one localized mass increase of the wheel.

The rim can, in particular, be a rim as outlined above.

In a first variant, the method comprises the step of providing, in a mold for forming the rim, a greater amount of structural fibers in a matrix of polymeric material in the intraspoke zones of the first sub-set than in the intraspoke zones of the second sub-set.

In a second variant, the method comprises the preliminary step of forming a rim having all of the intraspoke zones of equal average wall thickness and the step of removing material from the second sub-set of intraspoke zones.

The step of removing material can be carried out through mechanical working, in particular through milling, through chemical etching or through spark erosion.

DESCRIPTION OF THE EMBODIMENTS

In FIG. 1 a perspective view of a wheel 11 according to a first embodiment of the invention is shown. The wheel 11 represented, in particular a front wheel, has a hub 12, a rim 13 and a set of spoke connections 14 between the hub 12 and the rim 13.

Figure 2:
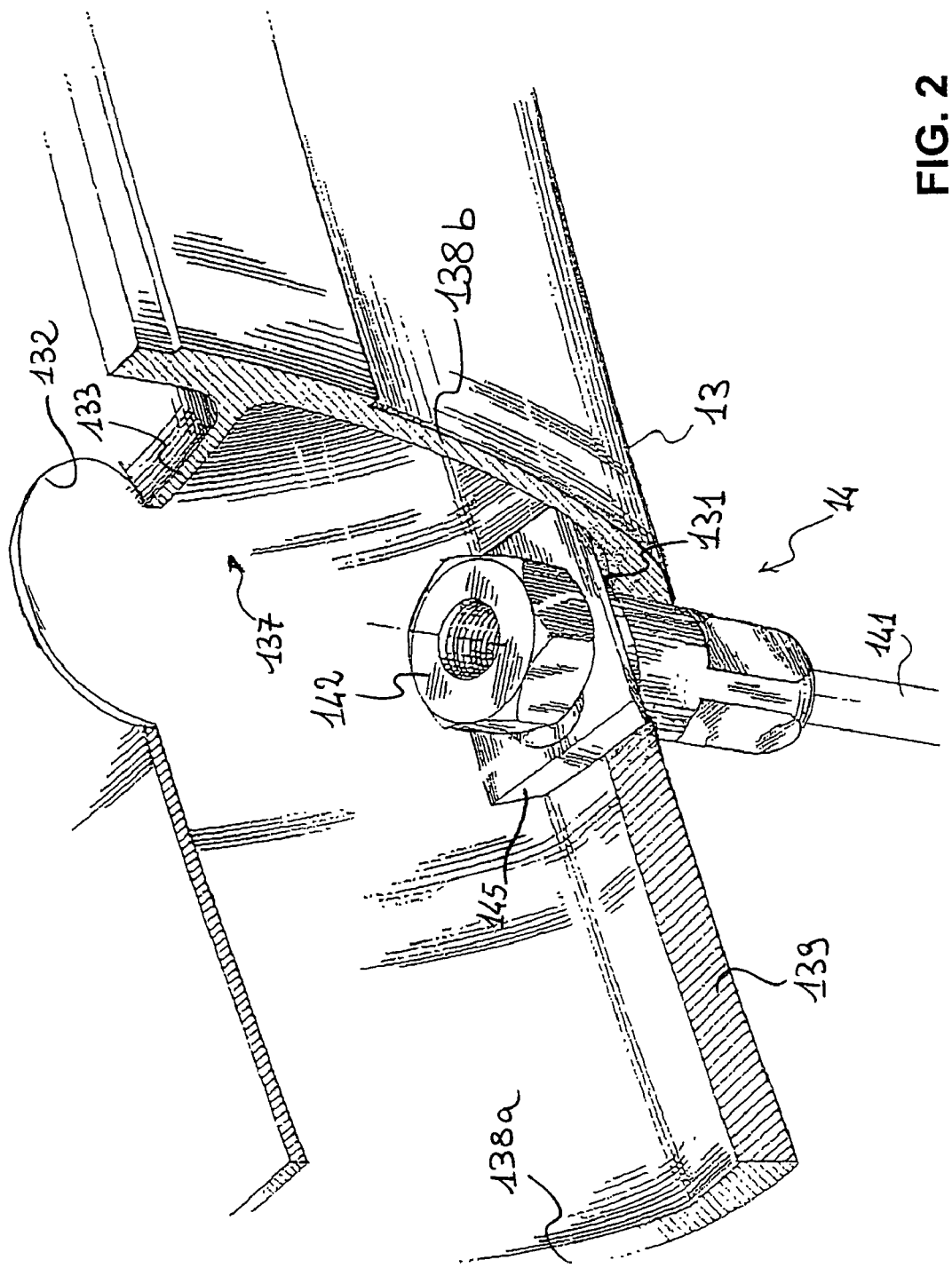
FIG. 2 is a partial perspective view of a rim portion having a spoke connection coupled therewith.

Also with reference to FIG. 2, each spoke connection 14 comprises a spoke 141 and an internally threaded element or nipple 142. Each spoke 141 typically comprises a head 143 at a first end, possibly bent at a bend 144 in the case of attachment to a flanged hub. The spoke also comprises an outer threading (not visible) at a second end, opposite the first end. The bend is normally absent in the case of a non-flanged attachment hub, for example as illustrated in U.S. Pat. No. 6,783,192. The head 143 of each spoke is housed in a corresponding seat 121 of the hub 12. The outer threading of the spoke 141 engages in the inner threading of the internally threaded element 142, which abuts, with the possible interposition of a plate 145, against the rim 13 at a respective seat 131. An opening 132 is also shown in the upper bridge 133 of the rim 13, for accessing the internally threaded element 142 with a tool.

However, it is possible to use any alternative configuration of the spoke connections 14, as is well known in the field, for example in which the internally threaded element 142 engages with the hub 12 and the head 143 of the spoke engages with the rim 13.

The spoke pattern of the wheel 11 is of the type with spoke connections 14 distributed equally spaced apart along the circumference of the rim 13.

The spoke pattern of the wheel 11 has an even number of spoke connections, namely sixteen spoke connections, eight on the right hand side of the hub 12 and eight on the left hand side of the hub 12. Thus, in the rim 13 sixteen spoke attachment zones 1501-1516 are defined, comprising respective spoke attachment seats 131 and their thereabouts, alternating with sixteen intraspoke zones 1601-1616. In particular, the sixteen intraspoke zones 1601-1616 extend along equal length arcs of the rim.

The rim 13 is of the metal type, made by extrusion of a rod having a suitable cross section, its calendaring and jointing of the ends at a jointing zone 134 to produce an annular rim body. As shown in FIG. 2, the rim body comprises a plurality of single layer walls including an upper bridge 133, a lower bridge 139, and opposite side walls 138a, 138b, connecting the upper bridge 133 and lower bridge 139.

In a position diametrically opposite the jointing zone 134, in the rim 13 a housing hole 135 is made for a valve 7 for retaining the air in a pneumatic tire (not shown) externally associated with the rim 13.

Figure 3:
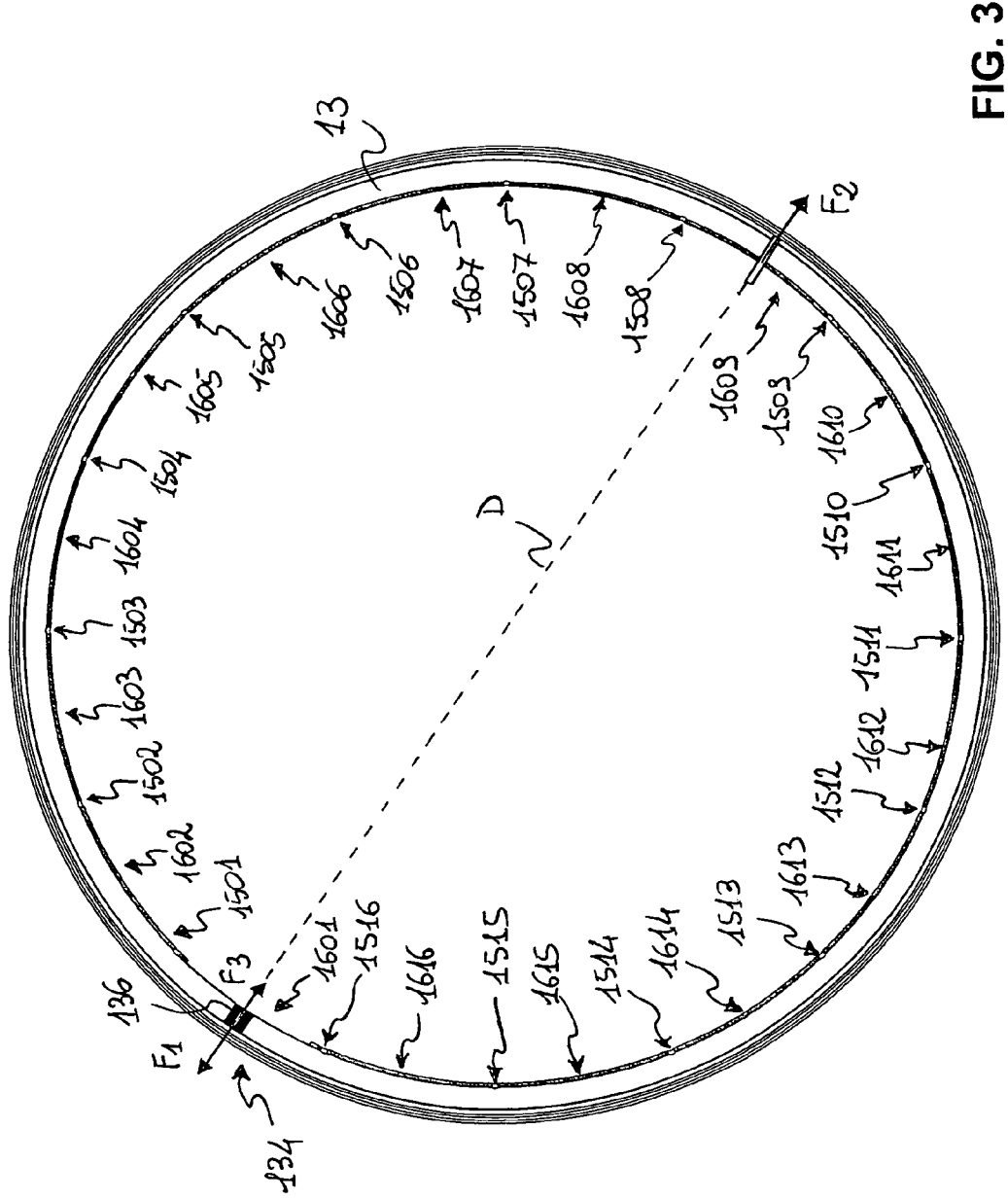
FIG. 3 is a section through the rim of the wheel of FIG. 1, with the valve fitted.
Figure 4:
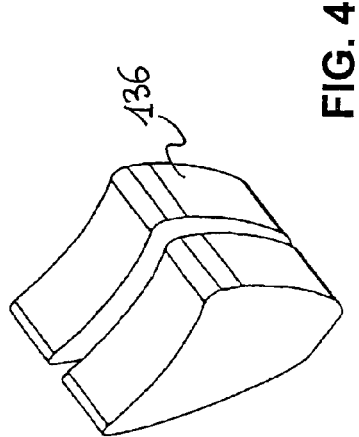
FIG. 4 is a perspective view of a pair of inserts for jointing of the rim.

The jointing in the zone 134 is carried out by butt welding of the ends of the extruded and calendared rod. In FIG. 3, which represents a section of the rim 13 with the valve 7 fitted, a pair of solid metal inserts 136 can be seen in an inner chamber of the rim 13. The inserts 136 are used to allow the ends to be gripped with suitable pincers during welding without the risk of deforming the rim 13. The inserts 136 are better illustrated in FIG. 4.

Figure 5:
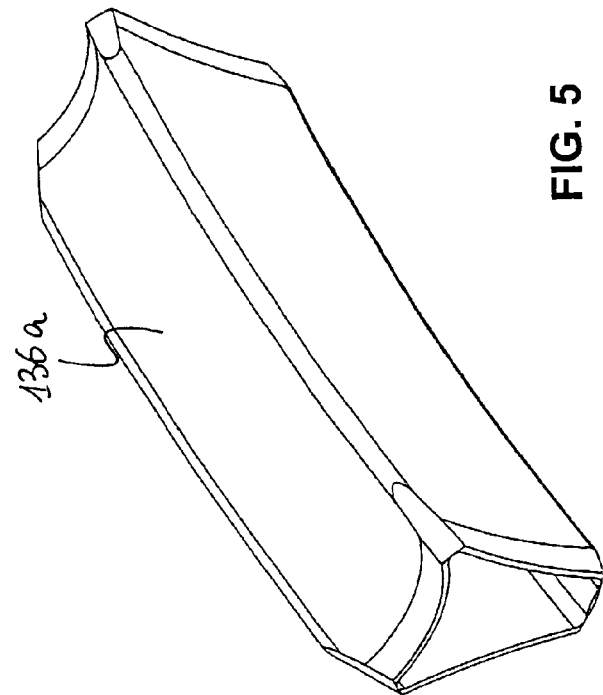
FIG. 5 is a perspective view of a sleeve for jointing of the rim.
Figure 6:
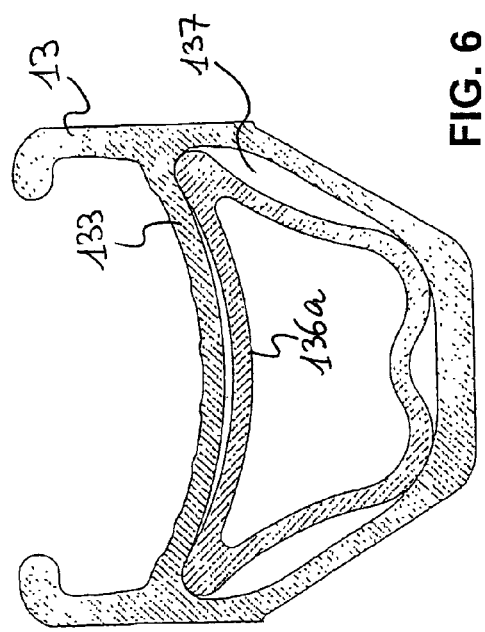
FIG. 6 is a cross-sectional view of the sleeve of FIG. 5 inserted in the rim.

As an alternative to welding and insertion of the inserts 136, the jointing in the zone 132 can take place through a sleeve 136a, illustrated in FIG. 5, interference fitted, and possibly glued, in the inner chamber 137 of the rim 13, as illustrated in FIG. 6. In a further alternative, the jointing in the zone 134 can take place through a plurality of pins inserted in the wall of the ends of the rim.

The inserts 136, including the possible welding material, or the other equivalent elements in the jointing zone 134, have a mass m1, which represents a mass discontinuity of the wheel 11, in particular a localized mass increase. The valve 7 is typically made of brass and represents another mass discontinuity of the wheel 11, in particular another localized mass increase. The localized mass increase due to the presence of the valve 7 minus the local mass reduction due to the presence of the hole 135 for the valve 7 itself shall hereinafter be indicated for the sake of brevity as mass m2 of the valve 7. As explained above, the mass m1 is usually different from the mass m2, so that the wheel 1 would be dynamically imbalanced, although the jointing zone 134 and the hole 135 for the valve 7 are diametrically opposite. In most cases, the mass m1 of the joint is greater than the mass m2 of the valve and we shall refer to this assumption in the present embodiment and in the subsequent embodiments. To reduce or even cancel out the imbalance of the wheel 1, i.e. to at least partially compensate for the aforementioned localized mass increases, in the rim 13, while the intraspoke zones 1602-1616 each have a mass mz, the intraspoke zone 1601 comprising the jointing zone 134 has a smaller mass, mz-m3. Such an intraspoke zone 1601 with reduced mass, just like analogous zones in the embodiments described below, is illustrated darkened in FIG. 1 for illustrative purposes, but in practice it can have the same coloration as the rest of the rim 13 or a different coloration without it making any difference.

The mass reduction m3 in the intraspoke zone 1601 is obtained through material-removing working to reduce the average wall thickness of the rim in such a zone 1601.

The material-removing working can, for example, be mechanical working, in particular milling, chemical etching or spark erosion, and can take place, in particular, as disclosed in European publication EP 0 715 001, U.S. Pat. No. 6,402,256 and U.S. Patent Publication No. US2005/0017569, the disclosures of which are incorporated herein by reference as if fully set forth.

Although in FIGS. 1 and 3 the reduction in thickness in the intraspoke zone 1601 is illustrated in the lower bridge 139 (FIG. 2) of the rim 13, the reduction in thickness can also or only be carried out in the upper bridge 133 or in either or both side walls 138a, 138b (FIG. 2).

Moreover, although in FIGS. 1 and 3, just like in the figures relative to the subsequent embodiments, the reduction in thickness in the intraspoke zone 1601 is illustrated as having a sharp edge, different geometries can be used for the transitions from the adjacent spoke attachment zones 1501 and 1516. In particular, the transitions can develop along a certain length of the rim, i.e. avoiding sharp edges and, on the other hand, creating fillets of a suitable radius of curvature or with a suitable curvilinear progression. Furthermore, the removal of material can also take place from the outside of the rim 13 and/or from inside the chamber 137. What is important for the purposes of the present invention is that the removal of material is such as to provide the required reduction in mass or, in other words, that there is a reduction in average wall thickness.

Finally, it should be noted that, although in FIGS. 1 and 3 the intraspoke zones 1602-1616 have the same thickness as the spoke attachment zones 1501-1516, this is not necessary. In particular, it falls within the scope of the present invention to provide a reduction in thickness of all of the intraspoke zones, but greater in size in zone 1601.

The resultant of the forces acting in the wheel 11 in dynamic conditions can be expressed by the following formula (1) where, just like in the subsequent formulae, vector values are indicated in bold type:

$$F = F1 + F2 + F3 \quad (1)$$

wherein the modules of the component forces are expressed by the following formulae:

$$F1 = m1 * \omega^2 * R1 \quad (2)$$

$$F2 = m2 * \omega^2 * R2 \quad (3)$$

$$F3 = m3 * \omega^2 * R3 \quad (4)$$

wherein $\omega$ stands for the angular speed of the wheel 11; R1, R2 and R3 stand for the distances from the center of the wheel 11 to the centers of mass of the mass m1 of the joint 134, of the mass m2 of the valve 7, and of the mass reduction m3 of the intraspoke zone 1601, respectively.

It should be noted that R1, R2 and R3 are substantially equal to each other and that the three component forces all lie along the diameter D common to the jointing zone 134 and the valve 7.

Moreover, it should be noted that the first component force F1 in formula (I), i.e. the effect of the joint in the zone 134, is opposite both the second component force F2, i.e. the effect of the valve 7, and the third component force F3, i.e. the effect of the mass reduction of the intraspoke zone 1601 with respect to the remaining intraspoke zones 1602-1616.

The above formula (I) thus reduces to the scalar expression of the following formula (5):

$$F = m1 * \omega^2 * R1 - m2 * \omega^2 * R2 - m3 * \omega^2 * R3 = (m1 - m2 - m3) * \omega^2 * R1 \quad (5)$$

Even with very low values of the mass reduction m3 of the intraspoke zone 1601, for example of 1 or 2 grams, the value of the resultant of the forces F gets close to zero and the dynamic imbalance of the wheel 11 reduces with respect to a wheel in which all of the intraspoke zones are identical to each other, irrespective of their mass mz, a wheel in which the module of the resultant force would be given by the formula (6):

$$F' = m1 * \omega^2 * R1 - m2 * \omega^2 * R2 = (m1 - m2) * \omega^2 * R1 \quad (6)$$

With a suitable selection of the mass reduction m3 of the intraspoke zone 1601 with respect to the remaining intraspoke zones 1602-1616, the imbalance due to the presence of the pair of inserts 136 or other type of joint and to the valve 7 can be totally cancelled out. If the mass reduction is given by the following formula (7):

$$m3 = m1 - m2 \quad (7)$$

the value of the resultant of the forces F is equal to zero.

Therefore, with such a value of the mass reduction m3, whereas a rim 13 without a valve 7 as commonly marketed will be imbalanced, once the valve 7 has been fitted, and also once the spoke connections and the hub have been mounted, the wheel 11 shall be perfectly balanced. In this respect it is worth highlighting that the values of the masses m1 and m2 of the valve 7 and of the jointing inserts 136 are predetermined and therefore the value m3 of the mass to be removed in the intraspoke zone 1601 can be easily calculated.

Example 1

Let us consider a brass valve 7, of standard size for road bicycles, having a mass of 6 grams, and a joint with a pair of aluminum inserts 136 with a mass of 10 grams.

With a mass reduction m3 of the intraspoke zone 1601 of 4 grams, the wheel 11 is perfectly balanced.

Figure 7:
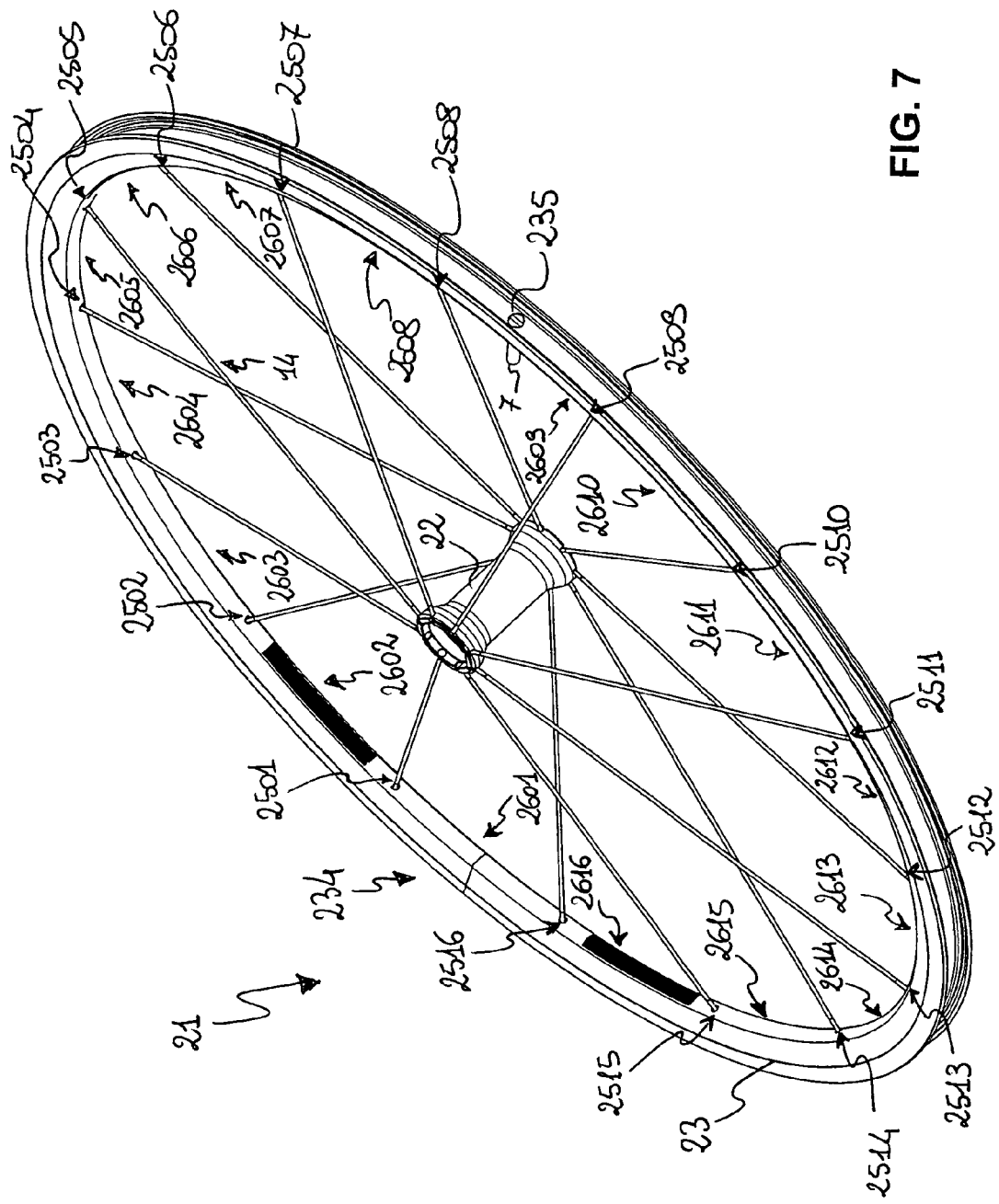
FIGS. 7 and 8 are perspective and section views respectively, of a second embodiment.
Figure 8:
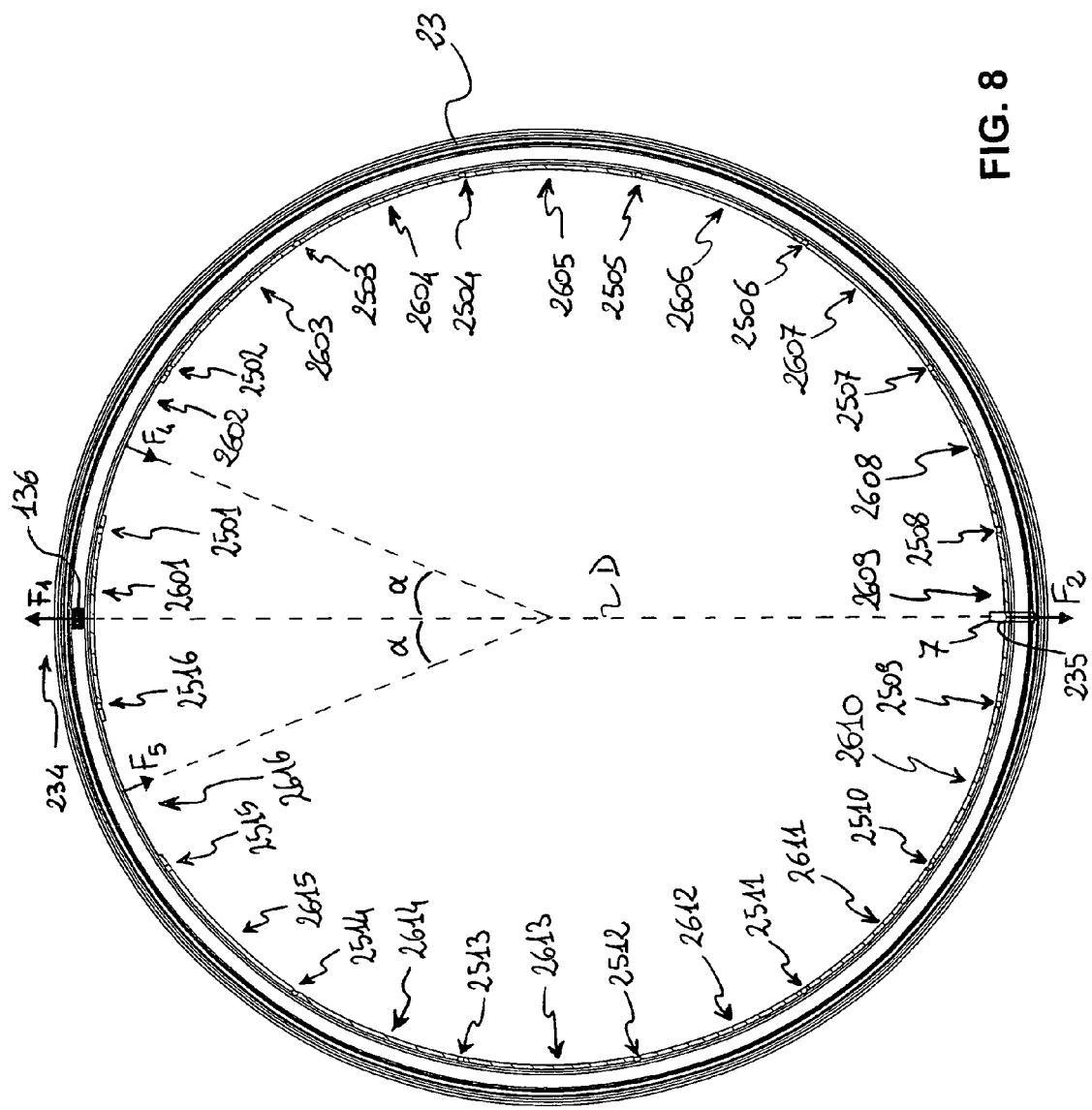

A wheel 21 according to a second embodiment of the invention is represented in FIG. 7. The relative rim 23 is represented in section, with the valve 7 fitted, in FIG. 8.

The wheel 21 differs from the wheel 11 of FIG. 1 in that both of the intraspoke zones 2602 and 2616 adjacent to the intraspoke zone 2601 comprising the jointing zone 234 have a reduced thickness and therefore a reduced mass, mz-m4 and mz-m5 respectively, with respect to the remaining intraspoke zones 2601 and 2603-2615, of mass mz.

The resultant of the forces acting in the wheel 21 in dynamic conditions can be expressed by the following formula (8):

$$F = F1 + F2 + F4 + F5 \qquad (8)$$

where $$F4 = m4 * \omega^2 * R4 \qquad (9)$$

$$F5 = m5 * \omega^2 * R5 \qquad (10)$$

wherein R4 and R5 stand for the distances from the center of the wheel 21 to the centers of mass of the mass reduction m4 of the intraspoke zone 2602 and of the mass reduction m5 of the intraspoke zone 2616, respectively. The remaining symbols are as described above with reference to the first embodiment.

It should also be noted that the forces F4 and F5 each form an angle α of 11.25° (one thirty-second of a revolution) with a diameter D extending between the zone of the joint 234 and the valve 7, the diameter along which the forces F1 and F2 act in opposite directions. If the masses m4 and m5 are the same, the resultant of the two forces F4 and F5 acts along the diameter D, in the opposite direction to the force F1.

Even with very limited values of the masses m4 and m5, for example of 1 or 2 grams, the dynamic imbalance of the wheel 21 is reduced with respect to a wheel in which all of the sixteen intraspoke zones 2601-2616 are identical to each other (formula (6)).

The above formula (8), in the particular case of equal masses m4 and m5 and considering the distances R1, R2, R4 and R5 as equal to each other, reduces to the scalar expression of the following formula (II):

$$F = m1 * \omega^2 * R1 - m2 * \omega^2 * R2 - m4 * \omega^2 * R4 * \cos \alpha - m5 * \omega^2 * R5 * \cos \alpha = (m1 - m2 - 2*m4*\cos \alpha) * \omega^2 * R1 \qquad (11)$$

The imbalance due to the presence of the pair of inserts 136 or another type of joint in the zone 134, and to the valve 7 can be totally cancelled out with a suitable selection of values m4 and m5, which cancels out the absolute value of the resultant of the forces F, as expressed by the following formula (12):

$$m4 = m5 = (m1 - m2)/2 * \cos \alpha \qquad (12).$$

Example 2

In the conditions illustrated above and with the values provided in example 1 for the masses m1 (10 grams) and m2 (6 grams), it is observed that with masses m4 and m5 of the intraspoke zones 2602 and 2616 of about 2.2 grams each, the wheel 21 is perfectly balanced.

It should be understood that as an alternative to the intraspoke zones 2602, 2616, the reduction in mass can be made in the intraspoke zones 2603 and 2615 adjacent them or in the intraspoke zones 2604 and 2614 adjacent the latter, simply by taking into account the greater angle that the relative forces form with the diameter D common to the jointing zone 234 and to the valve 7 when determining the value of the mass reduction. In such a case, the amount of material to be removed shall therefore be greater than the case of reduction in mass of the intraspoke zones 2602, 2616.

Again, it should be understood that an intermediate embodiment between the first and second embodiments illustrated above is possible, making mass reductions of suitable values in the intraspoke zones 3601, 3602 and 3616, or in the intraspoke zones 3601, 3603, 3615, or in the intraspoke zones 3601, 3604, 3614.

Figure 9:
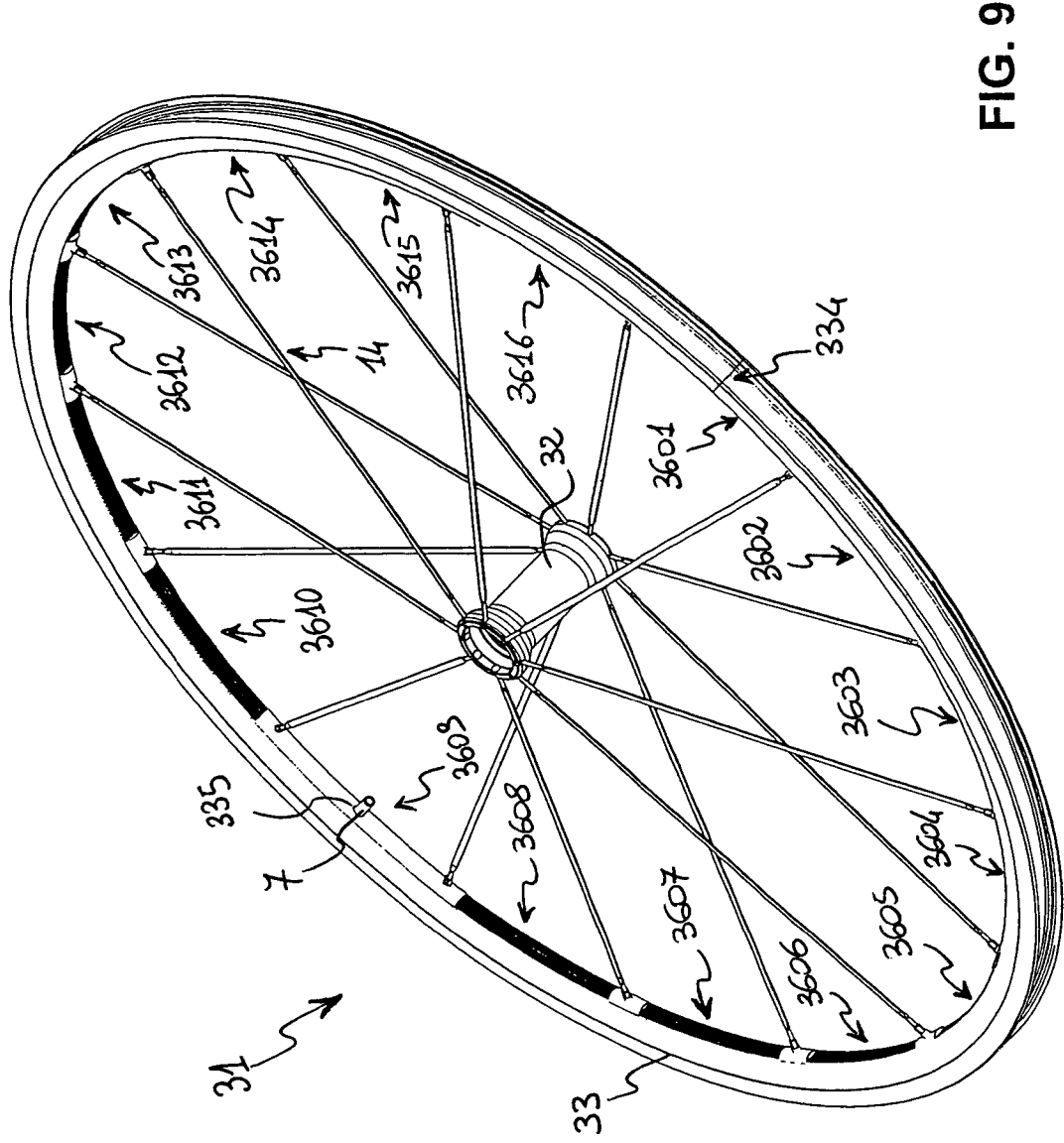

A wheel 31 according to a third embodiment of the invention is represented in FIG. 9. FIG. 10 shows the relative rim 33 represented in section, with the valve 7 fitted. A portion of the rim 33 is illustrated magnified in FIG. 11.

The wheel 31 differs from the wheel 11 of FIG. 1 in that, apart from the intraspoke zone 3609 comprising hole 335 for the valve 7 having a mass mz, not only the intraspoke zone 3601 comprising the jointing zone 334, but also all of the remaining intraspoke zones 3602-3608 and 3610-3616 have a reduced thickness and therefore a reduced mass, in particular mz-m3.

It can immediately be recognized that the forces due to two diametrically opposite intraspoke zones of reduced thickness, like for example the zones 3602 and 3610, being equal and opposite, cancel each other out.

The resultant of the forces acting in the wheel 31 in dynamic conditions is therefore once again expressed by the above formula (1).

It should be understood that the same expression (1) of the resultant force is obtained by making the intraspoke zones 3602-3608 and 3610-3616 of a reduced thickness to a different degree than the intraspoke zone 3601, for example of mass (mz-m3)±m6.

Moreover, it should be understood that the same expression (1) of the resultant force is obtained by making only one pair or a few pairs of diametrically opposite intraspoke zones 3602-3608 and 3610-3616 of a reduced thickness, for example of mass mz-m3 or (mz-m3)±m6. For example, a reduction in mass can be made in the intraspoke zones 3605 and 3613, or in the intraspoke zones 3603, 3611, 3605, 3613, 3607, 3615, etc.

Figure 12:
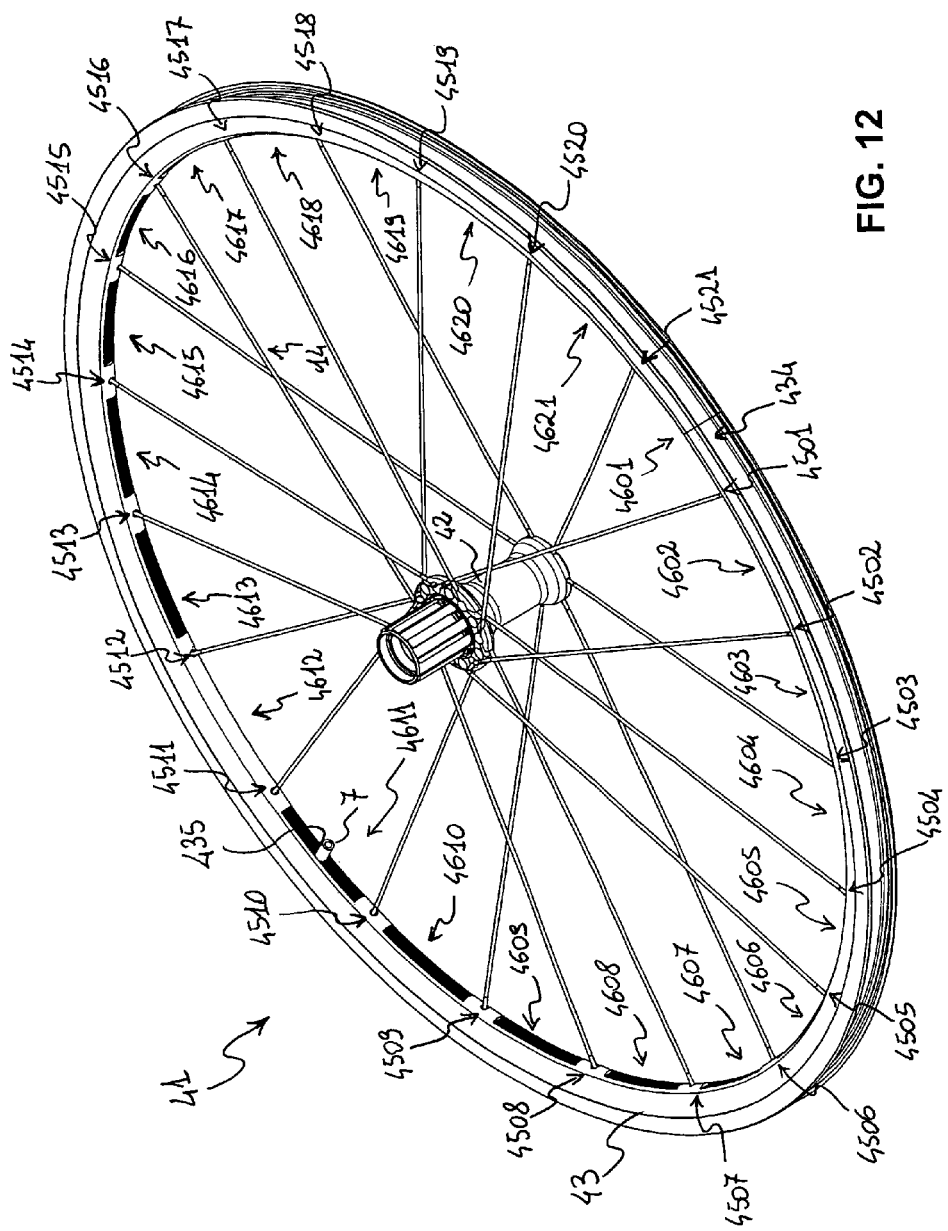

A wheel 41 according to a fourth embodiment of the invention is schematically represented in FIG. 12. FIG. 13 shows the relative rim 43 represented in section, with the valve 7 fitted. A portion of the rim 43 is illustrated magnified in FIG. 14.

The spoke pattern of the wheel 41 is again of the type having the spoke connections 14 distributed equally spaced along the circumference of the rim 43.

The spoke pattern of the wheel 41 comprises an odd number of spoke connections, namely twenty-one spoke connections 14, fourteen on the right hand side of the hub 42 and seven on the left hand side of the hub 42. Therefore, twenty-one spoke attachment zones 4501-4521 and twenty-one intraspoke zones 4601-4621 are defined.

The hole 435 for the valve 7 is not diametrically opposite the zone 434 of the joint, a position in which there is a seat 131 for a spoke connection 14. The hole 435 for the valve 7 is therefore at an angle of about 8.5° (one forty-second of a revolution) with respect to the diameter D1 passing through the zone 434 of the joint.

According to the invention, to reduce or even eliminate the dynamic imbalance of the wheel 41 resulting from the localized masses m1 of the joint 434 and m2 of the valve 7, it is provided to make a reduction in thickness, and therefore in mass, in all of the intraspoke zones apart from the intraspoke zone 4612 that is situated in a position mirroring the intraspoke zone 4611 comprising the hole 435 for the valve 7 with respect to the diameter D1. Also in FIG. 13, the intraspoke zones 4601-4611 and 4613-4621 of reduced thickness are darkened for illustrative purposes only.

The resultant of the forces F can be more easily expressed, for the present embodiment, considering, instead of the reduction in mass of the various intraspoke zones, the "additional mass" m7 of the intraspoke zone 4612, in other words the opposite of the mass reduction m3 that is not made in such an intraspoke zone 4612, as in the following formula (13):

$$F=F1+F2+F7 \quad (13)$$

wherein the absolute value of the force F7 is given by:

$$F7=m7*\omega^2*R7 \quad (14)$$

wherein R7 is the distance from the center of the wheel 41 to the center of mass of the mass m7 and the remaining symbols are as discussed above with reference to the first embodiment.

The distances R1, R2 and R7 can be considered to be substantially equal to each other.

The component force F7 and the component force F2, which is the effect of the valve 7, form an angle β of about 8.5° (one forty-second of a revolution) with a diameter D1 passing through the jointing zone 434.

In the case of the wheel 41, it is possible to reduce the dynamic imbalance with respect to a wheel in which all twenty-one intraspoke zones are substantially identical to each other even with very low values, for example 1 or 2 grams, of the reduction in mass of the zones 4601-4611 and 4613-4621 and, with suitably selected values of such a reduction in mass, to eliminate such an imbalance.

In the case in which the resultant of the forces F1 and F2 due to the localized mass increases resulting from the jointing zone 434 and the valve 7—the resultant to be compensated for through the force F7—forms a different angle with the diameter D1 from the angle β, it is possible to displace the center of mass of the "additional mass" m7 with a suitably asymmetric working of the intraspoke zone 4602 and/or by further providing a suitably asymmetric reduction in thickness of the intraspoke zone 4612 substantially diametrically opposite it and/or by arranging the hole 435 for the valve in a decentered position in the intraspoke zone 4611.

Example 3

Let us consider a brass valve 7, of a standard size for road bicycles, having a mass of 6 grams and a joint with a pair of aluminum inserts 136 having a mass of 7 grams.

With an "additional mass" m7 of the intraspoke zone 4612 of 2.6 grams, the resultant of the forces F is substantially zero and therefore the wheel 41 is substantially balanced.

In the case of the embodiment just described, it will be further understood that it is possible to leave other spoke attachment zones among the spoke attachment zones 4601-4611 and 4612-4621 at the original thickness or to work them differently. It is possible for example to identify groups of equally spaced intraspoke zones the component forces of which cancel each other out irrespective of the absolute value of their masses, for example the triplets 4303, 4310, 4317 and 4307, 4314, 4321 and similar, or groups of seven intraspoke zones.

Figure 15:
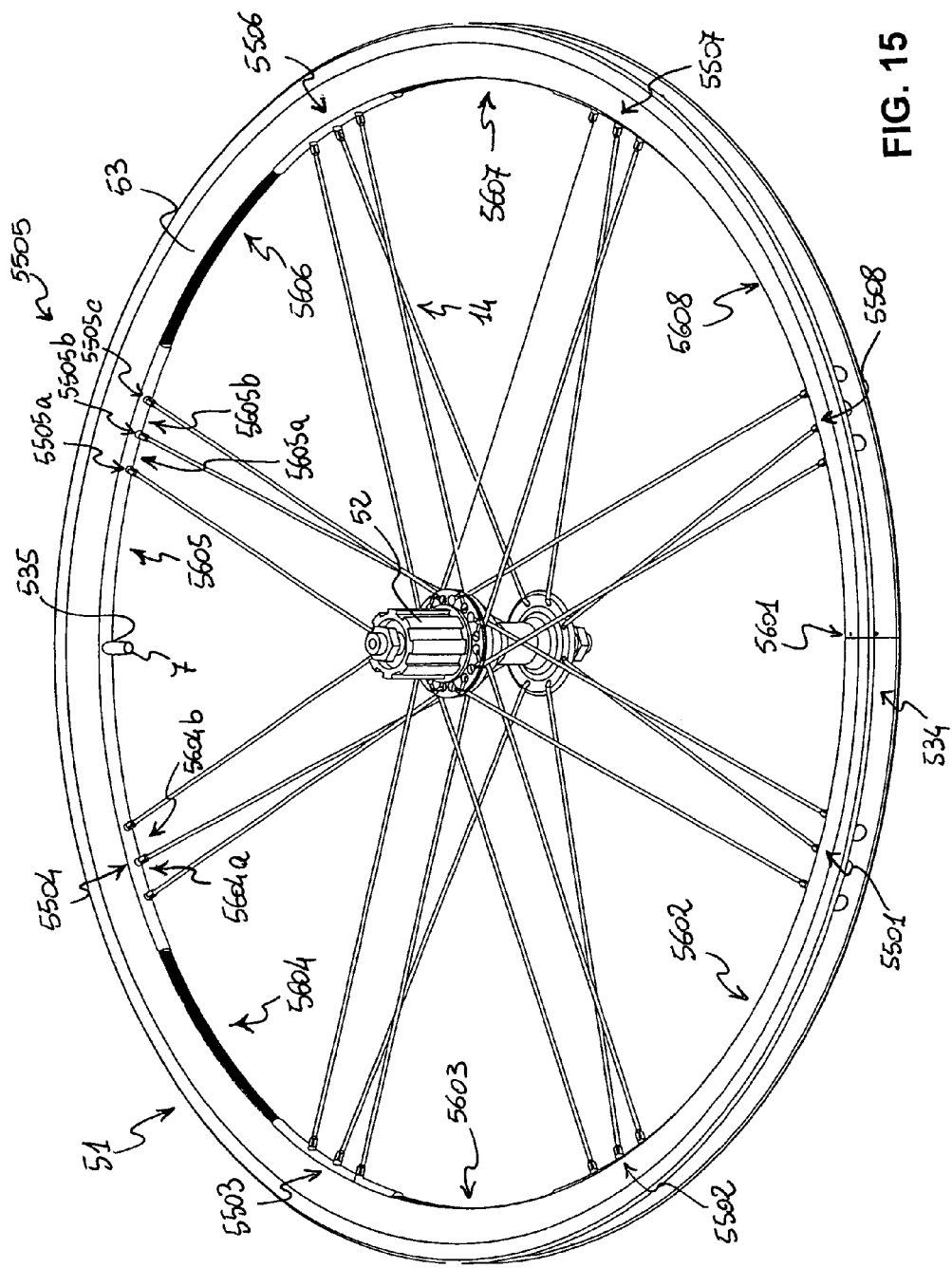

A wheel 51, in particular a rear wheel, according to a fifth embodiment of the invention is schematically represented in FIG. 15. The relative rim 53 is represented in section, with the valve 7 fitted, in FIG. 16.

The spoke pattern of the wheel 51 comprises twenty-four spoke connections 14 grouped into eight triplets. Eight zones of attachment of groups of spokes 5501-5508 are thus defined, each comprising three spoke attachment seats 131, alternating with eight intraspoke zones 5601-5608. In the zones of attachment of groups of spokes 5501-5508, 24 spoke attachment zones, among which only the zones 5505a, 5505b and 5505c are numbered in FIG. 15 for the sake of brevity, and another sixteen intraspoke zones, of which only the zones 5604a, 5604b, 5605a and 5605b are numbered in FIG. 15 for the sake of brevity, can be defined.

The spoke pattern of the wheel 51 therefore has an even number of spoke connections and the hole 535 for the valve 7 is advantageously made diametrically opposite the zone 534 of the joint, along the diameter D.

The fact that the spokes are grouped together and therefore the intraspoke zones have different extents makes no difference to the application of the inventive concepts.

Thus, it is possible to reduce or even eliminate the dynamic imbalance of the wheel 51 resulting from the localized masses m1 of the joint 534 and m2 of the valve 7 in a conceptually identical manner to the first, to the second or to the third embodiments described above, taking into account all of the generalizations thereof.

According to a first approach, the inventive concepts outlined above can be applied considering only the intraspoke zones 5601-5608 between the zones of attachment of groups of spokes, which are those with the longest extent.

Figure 16:
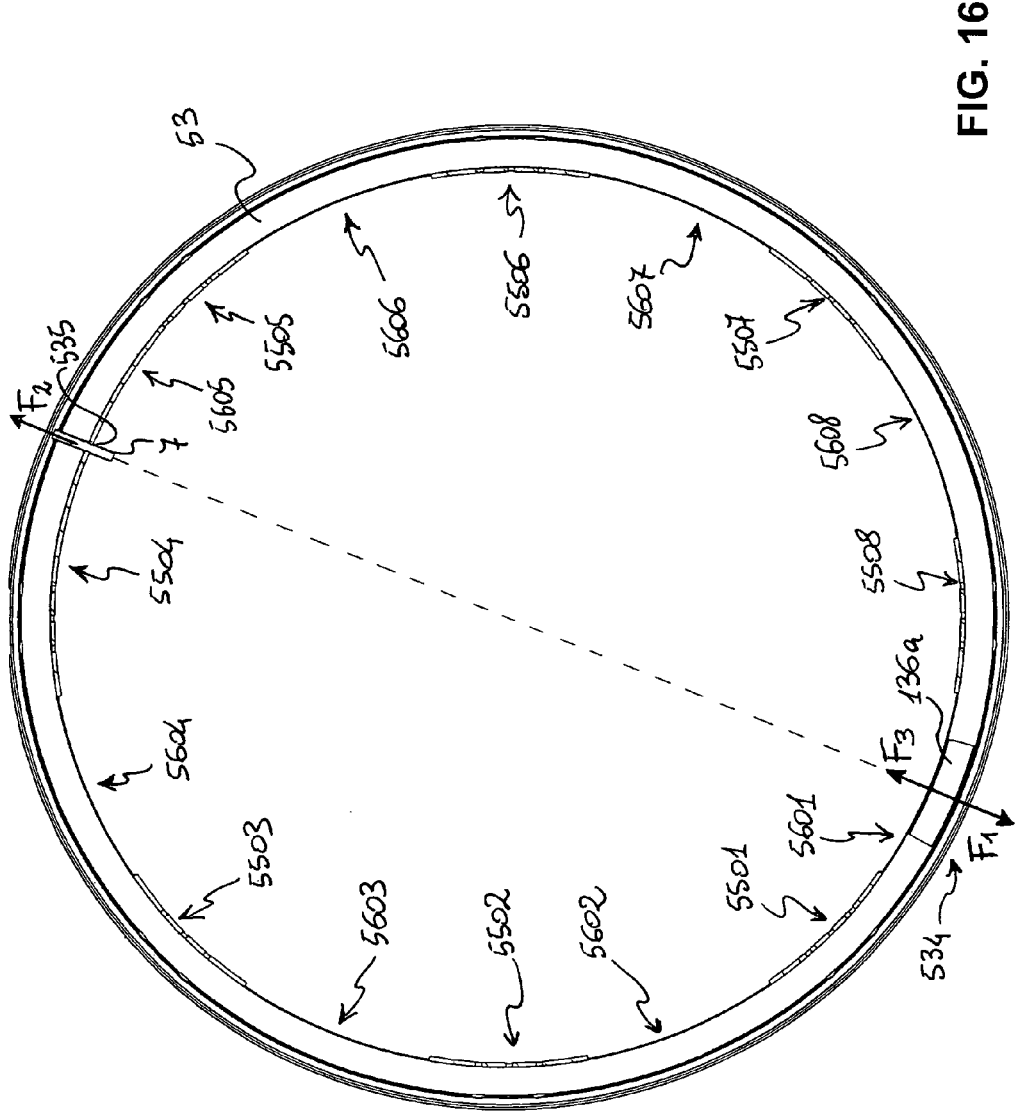

For example, the wheel 51 of FIGS. 15 and 16 corresponds to the third embodiment, in other words a reduction in thickness, and therefore in mass, is made in all of the intraspoke zones 5601-5604 and 5605-5608 among the zones of attachment of groups of spokes, apart from the intraspoke zone 5605 comprising the hole 535 for the valve 7. Also in FIG. 15, the intraspoke zones of reduced thickness are darkened for illustrative purposes only.

It should also be noted that in FIG. 16 a joint is indicated using the sleeve 136a of FIGS. 5 and 6, but also in this case it is possible to use the alternative jointing means described above with reference to the first embodiment.

The resultant of the forces F is once again expressed by formula (I) and it is possible to obtain a perfect balance, as in the following example.

Example 4

Let us consider a brass valve 7, of a standard size for road bicycles, having a mass of 6 grams and a joint having an aluminum sleeve 136a with a mass of 11 grams.

With a value of mass reduction m3 of the intraspoke zone 5601 (and of the intraspoke zones 5602-5604 and 5606-5608) of 5 grams, the resultant of the forces F is zero and therefore the wheel 41 is perfectly balanced.

According to a different approach, the inventive concepts outlined above, in their most general sense, can however be applied also considering the intraspoke zones 5605a, 5605b and analogous ones.

Merely as an example, in a solution corresponding to the second embodiment, the reduction in mass could be made in the intraspoke zones 5604b and 5605a and/or in the intraspoke zones 5604a, 5605b, and/or in the intraspoke zones 5604, 5606.

Figure 17:
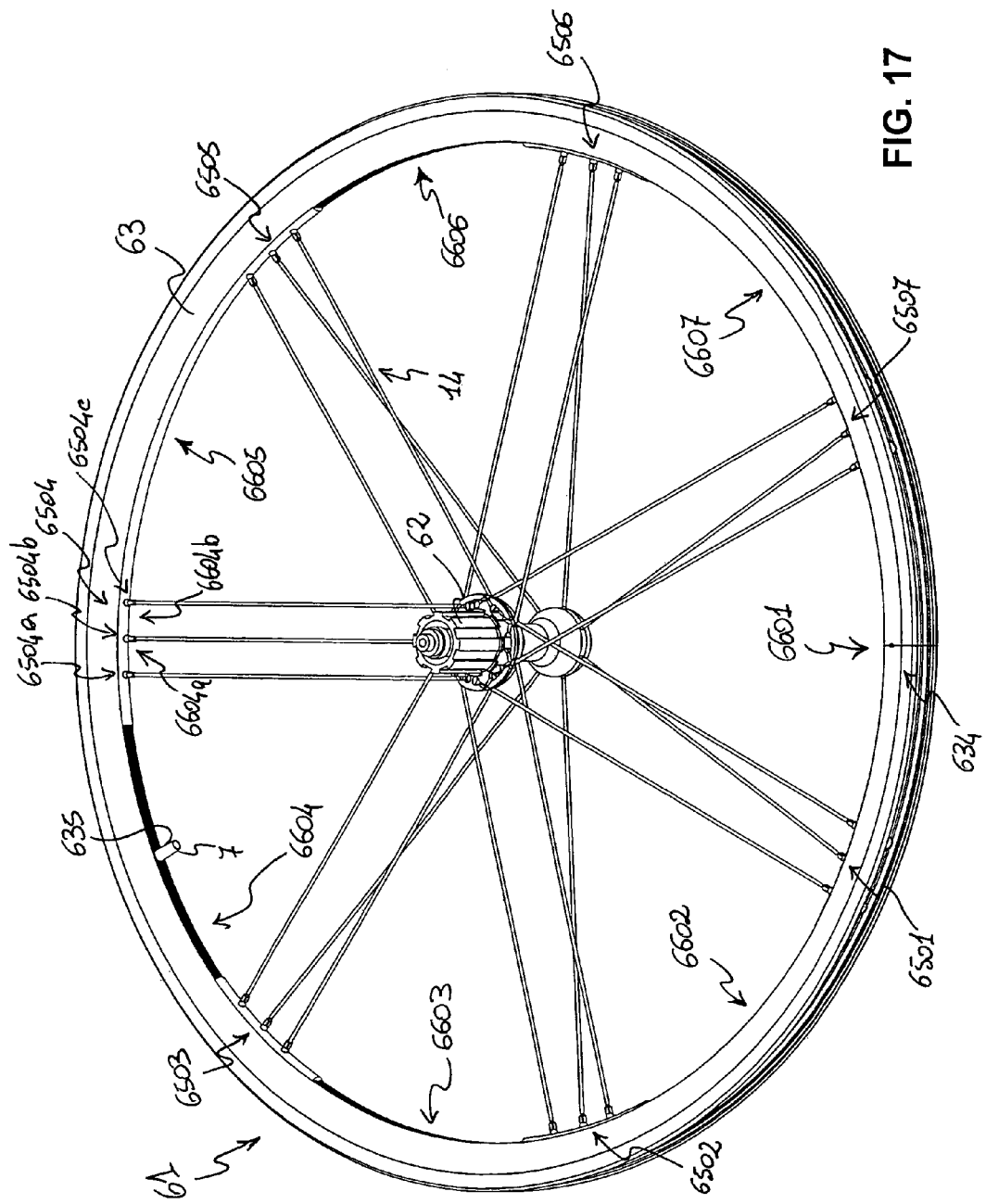
FIGS. 17 and 18 are perspective and section views respectively, of a sixth embodiment.

A wheel 61, in particular a rear wheel, according to a sixth embodiment of the invention is schematically represented in FIG. 17. The relative rim 63 is represented in section, with the valve 7 fitted, in FIG. 18.

The spoke pattern of the wheel 61 comprises twenty-one spoke connections 14 grouped into seven triplets. Therefore, seven zones of attachment of groups of spokes 6501-6507 are defined, each comprising three spoke attachment seats 131, alternating with seven intraspoke zones 6601-6607. In the zones of attachment of groups of spokes 6501-6507, 21 spoke attachment zones, of which only zones 6504a, 6504b and 6504c are numbered in FIG. 17 for the sake of brevity, and another fourteen intraspoke zones, of which only zones 6604a and 6604b are numbered in FIG. 17 for the sake of brevity, can be defined.

The spoke pattern of the wheel 61 has an odd number of spoke connections, and the hole 635 for the valve 7 is not diametrically opposite the zone 634 of the joint, a position in which there is a seat 131 for a spoke connection 14. The hole 635 for the valve 7 is therefore at an angle γ of about 25.7° (one fourteenth of a revolution) with respect to the diameter D1 passing through the zone 634 of the joint.

Figure 18:
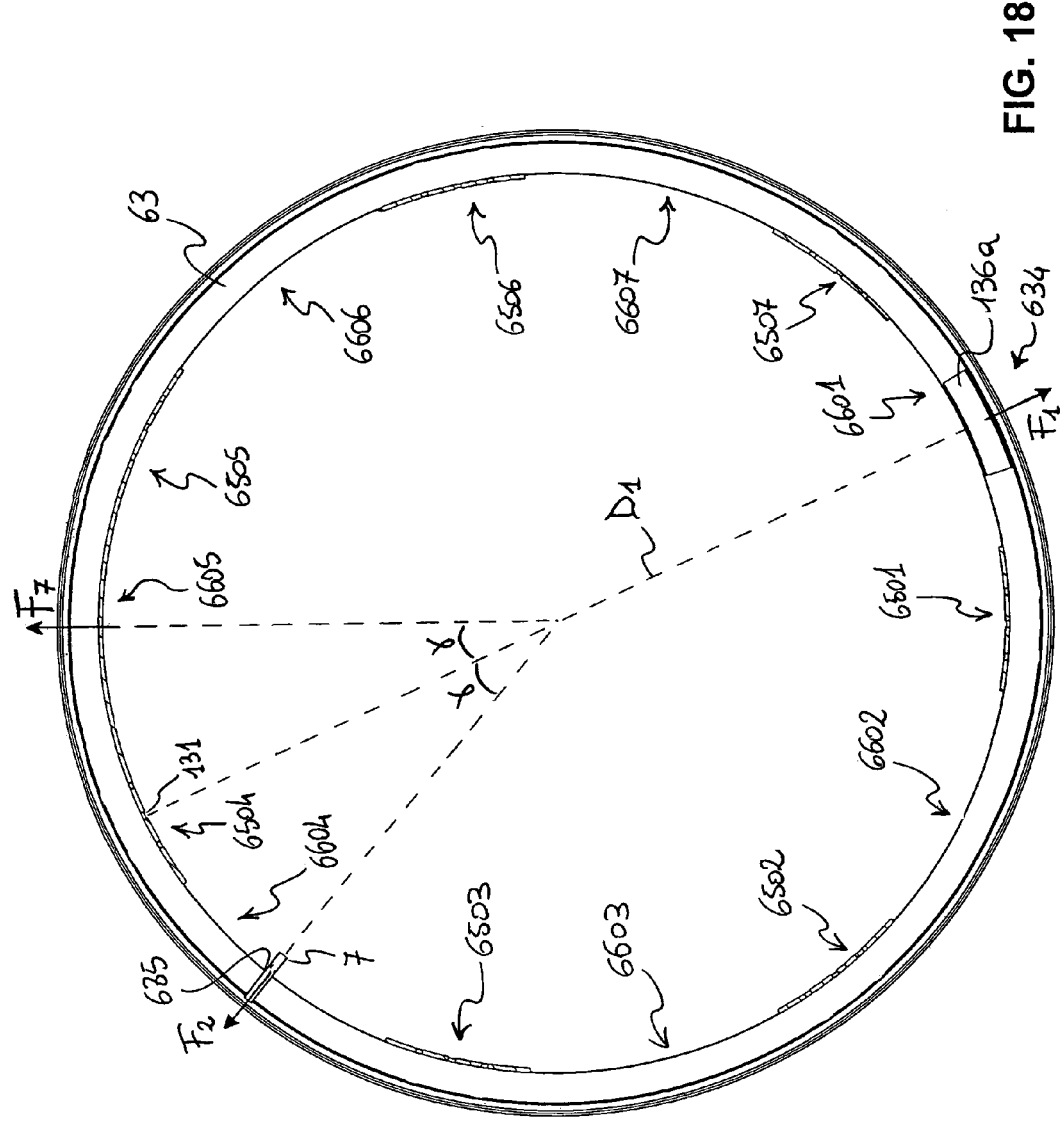

Also in FIG. 18 a joint is indicated using the sleeve 136a of FIGS. 5 and 6, but it is possible to use the alternative jointing means described above with reference to the first embodiment.

Also in the case of a spoke pattern with an odd number of triplets (or of groupings of another number of spoke connections), the fact that the spokes are grouped together and therefore the intraspoke zones have different extents makes no difference to the application of the inventive concepts.

Thus, it is possible to reduce or even eliminate the dynamic imbalance of the wheel 61 resulting from the localized masses m1 of the joint 634 and m2 of the valve 7 in an conceptually identical manner to the fourth embodiment described above, taking into account all of the generalizations thereof, considering only the intraspoke zones 6601-6607 between the zones of attachment of groups of spokes, having a longer extent or distance along the rim, and considering also the intraspoke zones 6604a, 6604b and analogous ones.

As an example, in the wheel 61 of FIGS. 17 and 18, to reduce or even eliminate the dynamic imbalance of the wheel 61 resulting from the localized masses m1 of the joint 634 and m2 of the valve 7, it is provided to make a reduction in thickness, and therefore in mass, in the intraspoke zones 6601-6607, which represent all of the intraspoke zones between the zones of attachment of groups of spokes, apart from the intraspoke zone 6605 that is in a position mirroring the intraspoke zone 6604 comprising the hole 635 for the valve 7 with respect to the diameter D1. Also in FIG. 17, the intraspoke zones 6601-6604 and 6606-6607 of reduced thickness are darkened for illustrative purposes only.

The resultant of the forces F can once again be expressed by the formula (13) considering, instead of the reduction in mass of the various intraspoke zones, the "additional mass" m7 of the intraspoke zone 6605, in other words the opposite of the mass reduction m3 that is not made in such an intraspoke zone 6605.

The component force F7 and the component force F2, which are the effect of the valve 7, form an angle γ of about 25.7° (one fourteenth of a revolution) with the diameter D1 passing through the jointing zone 634.

Also in the case of the wheel 61, it is possible to reduce the dynamic imbalance with respect to a wheel in which all seven intraspoke zones are substantially identical to each other even with very low values, for example 1 or 2 grams, of the reduction in mass of the zones 6601-6604 and 6606-6607 and, with suitably selected values of such a reduction in mass, to substantially eliminate such an imbalance.

Example 5

Let us consider a brass valve 7, of a standard size for road bicycles, having a mass of 6 grams and a joint with an aluminum sleeve 136a having a mass of 11 grams.

With a mass reduction m3 of all of the intraspoke zones 6601-6604 and 6606-6607 extending between zones of attachment of groups of spokes, apart from the intraspoke zone 6605, of 6 grams, the resultant of the forces F is substantially zero and therefore the wheel 61 is substantially balanced.

Just as another example, the reduction in mass could additionally be made in the intraspoke zone 6604a and/or in the intraspoke zone 6604b, so as to compensate, in an even more accurate manner, for the resultant of the forces F1 and F2 due to the localized mass increases resulting from the jointing zone 634 and the valve 7, in the case in which it forms with the diameter D1 a different angle from angle γ.

In the previous embodiments the assumption that the mass m1 of the joint is greater than the mass m2 of the valve was considered since this is the most common situation. Those skilled in the art shall, however, understand that in case the mass m1 of the joint is, on the other hand, lower than the mass m2 of the valve, the solutions described up to now shall be applied mutatis mutandis.

Of course, it will also be understood that what stated above with reference to the first embodiment concerning the type and geometry of the material-removal working is valid for all of the other embodiments.

FIG. 19 represents a wheel 71, in particular a rear wheel, according to a seventh embodiment of the invention. The relative rim 73 is represented in section, with the valve 7 fitted, in FIG. 20. A portion of the rim 73 is illustrated magnified in FIG. 21.

The spoke pattern of the wheel 71 is identical to the one described above with reference to the wheel 51 of the fifth embodiment (FIG. 15), with twenty-four spoke connections grouped together into triplets. Therefore, eight zones of attachment of groups of spokes 7501-7508 and eight intraspoke zones 7601-7608 are defined. In the zones of attachment of groups of spokes 7501-7508, 24 spoke attachment zones, of which only the zones 7505a, 7505b and 7505c are numbered in FIG. 19 for the sake of brevity, and another sixteen intraspoke zones, of which only the zones 7605a and 7605b are numbered in FIG. 19 for the sake of brevity, can be defined.

In the wheel 71, the rim 73 is however made of composite material, made by molding and reticulation or curing of a fibrous material, for example carbon fiber, in a matrix of polymeric material. The details of the manufacture of the rim 73 can be found for example in U.S. Pat. No. 6,761,847 which is incorporated herein by reference. The rim 73 is in a single piece, and therefore, does not comprise a joint.

Also in the case of the rim 73, there is nevertheless a localized mass discontinuity or increase, represented by the valve 7, which is dynamically compensated, according to the invention, through a reduction in mass in some intraspoke zones, obtained through a reduction in thickness.

The reduction in thickness, in the case of rims made from composite material, can be obtained with subsequent material-removal working, in the manner and according to the geometries indicated above.

Such working can, however, also advantageously be obtained not with subsequent material-removal working, rather directly in the manufacture step of the rim 73, by simply arranging a smaller amount of material in the mold at the desired regions. In this regard, it should be noted that, as described for example in the aforementioned U.S. Pat. No. 6,761,847, the carbon fiber material in a matrix of polymeric material is available in plies, which are layered to obtain the desired thickness of the various regions of the rim, for example different thicknesses for the lower bridge 139, the upper bridge 133 and the side walls 138*a*, 138*b* (FIG. 2). A smaller number of plies can therefore be arranged in the mold at those intraspoke zones that, according to the present invention, shall have a reduced mass to at least partially compensate for the localized mass increase resulting from the valve 7.

Given that in the case of a single-piece rim 73, the valve 7 is the only localized mass increase present, the reduction in thickness is made, in the present embodiment, in the intraspoke zone 7605 comprising the hole 735 for the valve 7.

The resultant of the centrifugal forces acting in the wheel 71 in dynamic conditions can be expressed by the following formula (15):

$$F = F2 + F8 \quad (15)$$

wherein the absolute value of the force F8 is given by:

$$F8 = m8 * \omega^2 * R8 \quad (16)$$

wherein R8 is the distance from the center of the wheel 71 to the center of mass of the mass reduction m8 of the intraspoke zone 7605 with respect to the remaining intraspoke zones 7601-7604 and 7606-7608 similarly extending between zones of attachment of groups of spokes, and the remaining symbols are as discussed above.

It should be noted that the force F8 and the force F2, i.e. the effect of the localized mass increase resulting from the valve 7, both act along a diameter D2 passing through the valve 7, according to opposite directions.

Also in the case of the wheel 71, it is therefore possible to reduce the dynamic imbalance with respect to a wheel in which all eight intraspoke zones 7601-7608 extending between zones of attachment of groups of spokes are identical to each other even with very low values, for example 1 or 2 grams, of the reduction in mass of the intraspoke zone 7605 and, with a suitably selected value of such a mass, to eliminate such an imbalance.

In case one selects:

$$m8 = m2 \quad (17)$$

the resultant of the forces F is equal to zero and therefore the set consisting of the rim 73 and the valve 7 is perfectly balanced, just like the wheel 71.

Example 6

Let us consider a brass valve 7, of a standard size for road bicycles, having a mass of 6 grams, and let us neglect the effects of the hole 735 for the valve 7.

The force F2, of absolute value $m2 * \omega^2 * R2$, will be compensated for by a reduction in mass of the intraspoke zone 7605 of 6 grams with respect to the remaining intraspoke zones 7601-7604 and 7606-7608.

Figure 22:
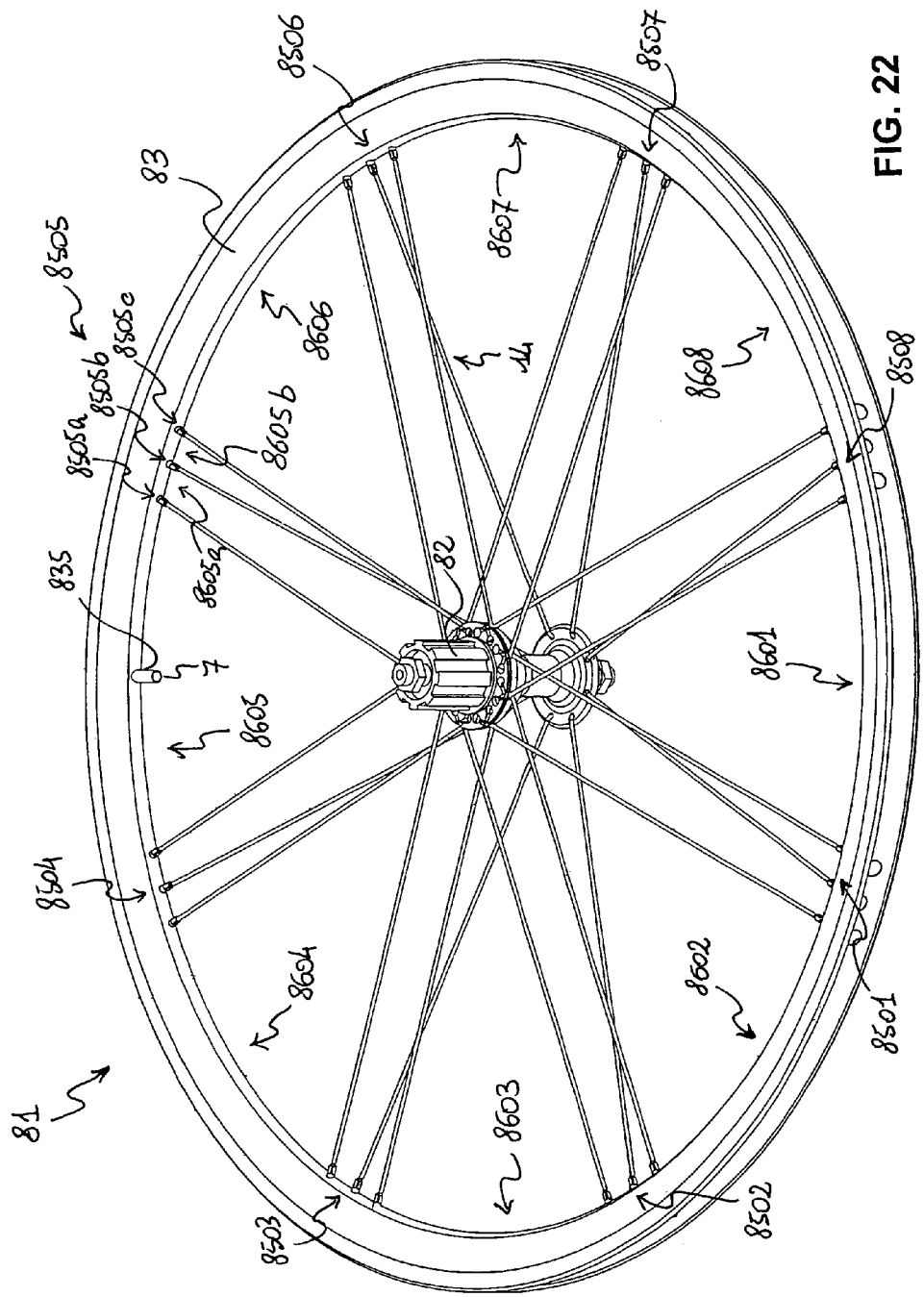

FIG. 22 represents a wheel 81, in particular a rear wheel, according to an eighth embodiment of the invention and the relative rim 83 is represented in section, with the valve 7 fitted, in FIG. 23. A portion of the rim 83 is illustrated magnified in FIG. 24.

The spoke pattern of the wheel 81 is identical to the one described above with reference to the wheel 71 of the seventh embodiment (FIG. 19), with twenty-four spoke connections grouped together in triplets. Therefore, eight zones of attachment of groups of spokes 8501-8508 and eight intraspoke zones 8601-8608 are defined. In the zones of attachment of groups of spokes 8501-8508, 24 spoke attachment zones, of which only the zones 8505*a*, 8505*b* and 8505*c* are numbered in FIG. 22 for the sake of brevity, and other sixteen intraspoke zones, of which only the zones 8605*a* and 8605*b* are numbered in FIG. 22 for the sake of brevity, can be defined.

Also in the wheel 81, the rim 83 is made from single-piece composite material, and therefore it does not comprise a joint; there is, however, a localized mass increase represented by the valve 7.

The compensation according to the invention takes place, like in the seventh embodiment described above, through a reduction in mass made in the intraspoke zone 8605 comprising the hole 835 for the valve 7.

In the case of the rim 83, however, the reduction in thickness in the intraspoke zone 8605 involves just the two end portions 871 and 872 of the zone itself, whereas in the central portion 873 of the intraspoke zone 8605, where there is the hole 835 for the valve 7, the thickness of the wall of the rim 83 is not reduced or even is increased with respect to the rest of the rim 83. In such a way, the zone of the hole 835 for the valve 7, which represents a weak point of the rim 83, is kept at a thickness suitable for imparting the necessary structural strength to the rim 83.

The resultant of the forces acting in the wheel 81 in dynamic conditions can again be expressed by formula (15). The mass reduction m8 necessary for the perfect balance of the rim 83, once the valve 7 has been fitted, is again expressed by formula (17), since the center of mass of the mass reduction is again along the diameter D2 passing through the valve 7, wherein the value of R8 is slightly smaller than the value of R8 of example 6.

Of course, it is possible, as an alternative to the seventh and eighth embodiments described above, to reduce or eliminate the imbalance of the wheels 71 and 81 also in an analogous manner to the second embodiment described above, or to a combination of such embodiments, in other words by making two reductions in thickness, and therefore in mass, alternatively or in addition to the zone 7605, in one or more pairs of intraspoke zones arranged symmetrically with respect to the intraspoke zone 7605, like for example in the intraspoke zones 7604 and 7606 and/or in the intraspoke zones 7604*b* and 7605*a*, etc.

Moreover, it is possible to make further reductions in mass, by the same or varying amounts, in pairs of diametrically opposite intraspoke zones, for example in the intraspoke zones 7603 and 7607, or else in the intraspoke zones 7602, 7604, 7606, 7608, or, furthermore, in the intraspoke zones 7602-7608, which represent all of the zones extending between zones of groups of spokes, apart from the intraspoke zone 7601 diametrically opposite the intraspoke zone 7605, in a conceptually analogous manner to the third embodiment.

Generally, it should be understood that, in the case of single piece rims of whatever type of spoke pattern, be it single or with groups of spoke connections, and also in the case of spoke patterns comprising an odd number of spoke connections, it is always possible to completely eliminate the dynamic imbalance by making the reduction in thickness in the intraspoke zone comprising the hole for the valve and/or in at least one pair of intraspoke zones arranged symmetrically with respect to it, in the half of the rim centered about the hole for the valve.

In the case of rims with a jointing zone, for example, in metal rims, it should be understood that it is generally possible to provide any number of intraspoke zones with reduced mass, so that they prevail in the half of the rim centered about the greatest localized mass increase, usually the zone of the joint.

When the zone of the joint and the hole for the valve are diametrically opposite or in any case in diametrically opposite intraspoke zones, the general concept outlined above can be applied, considering that the two localized mass increases are the equivalent to just one arranged in the point of the heaviest one. Therefore, with any type of spoke pattern, be it single or with groups of spoke connections, and also in the case of spoke patterns comprising an odd number of spoke connections, it is always possible to completely eliminate the dynamic imbalance by making the reduction in thickness in the intraspoke zone comprising the heaviest mass increase and/or in at least one pair of intraspoke zones arranged symmetrically with respect to it, in the same half of the rim. Small deviations from exactly diametrically opposite positions of the jointing zone and the hole for the valve can be taken into account with an asymmetric progression in the wall thickness of the zone(s) of the second sub-set involved by the reduction in thickness.

When the zone of the joint and the hole for the valve are not diametrically opposite, it is possible to make a reduction in mass in at least one intraspoke zone arranged on the same side with respect to the position of the lightest localized mass increase, with respect to the diameter passing through the position of the heaviest localized mass increase and in the half of the rim centered about the latter.

In particular, this shall be the intraspoke zone adjacent the position of the heaviest localized mass increase or in the adjacent one of the same extent, in the case of a spoke pattern with groups of spokes.

However, it must be clear that the present invention is not limited, in the case of rims with jointing like for example metal rims, by the fact that the zone of the joint is diametrically opposite, or substantially opposite, with respect to the valve. Those skilled in the art will understand that in case such elements are closer together it shall be sufficient to increase the reduction in mass of the intraspoke zone(s) of reduced mass, which shall be arranged in a suitable position, closer to the greatest localized mass increase, usually the joint.

It is also possible to provide for a separate compensation of the localized mass increases represented by the jointing zone and by the valve, for example by providing that both the intraspoke zone comprising the joint and the intraspoke zone comprising the hole for the valve are of suitably reduced thickness, and/or that pairs of intraspoke zones mirroredly arranged about the intraspoke zone comprising the joint and pairs of intraspoke zones mirroredly arranged about the intraspoke zone comprising the hole for the valve are of suitably reduced thickness.

Besides the general criteria outlined above, it is also possible to make further reductions in at least one group of intraspoke zones, said group having a rotational symmetry, since in such a case the sum of the masses of the group is zero. Suitable groups comprise two diametrically opposite zones, triplets zones at angles of 120° and the like.

To reduce the weight of the rim, it is therefore possible substantially in all conditions to achieve a rim having just one or two intraspoke zones integral or of high thickness, or just one or two of the intraspoke zones extending between groups of spokes.

It is worth once again highlighting that the reductions in thickness of each zone can have asymmetric geometries, for example to compensate for an asymmetric arrangement of the hole for a valve and/or of the joint in the respective intraspoke zone, or to more accurately compensate for the two localized mass increases, should they not be diametrically opposite.

Moreover, the solution of the eighth embodiment, of making three regions of different thickness in the intraspoke zone comprising the hole for a valve, can also be applied with metal joints, if the reduction in thickness provided according to the invention must also involve such a zone, like in particular if the valve is heavier than the jointing zone.

The invention claimed is:

1. An annular rim of a spoked bicycle wheel defining an axial direction and a radial direction, comprising a lower bridge having a greater extent along the axial direction than along the radial direction, the lower bridge having spoke attachment zones and intraspoke zones, wherein said intraspoke zones comprise a first sub-set of intraspoke zones each having a first average wall thickness and a second sub-set of intraspoke zones, each intraspoke zone of the second sub-set having an average wall thickness that is made lower than said first average wall thickness removal of material, said intraspoke zones of the second sub-set being arranged to at least partially compensate for at least one localized mass increase of the wheel, and the spoke attachment zones each have an average wall thickness that is not lower than said first average wall thickness.

2. The rim according to claim 1, wherein said at least one localized mass increase comprises a first localized mass increase at a first position and said second sub-set comprises an intraspoke zone that comprises the first position.

3. The rim according to claim 1, wherein said at least one localized mass increase comprises a first localized mass increase at a first position and said second sub-set comprises at least one pair of intraspoke zones arranged symmetrically about said first position, in a half of the rim centered about the first position.

4. The rim according to claim 2, wherein said at least one localized mass increase comprises a first localized mass increase at a first position and said second sub-set comprises at least one pair of intraspoke zones arranged symmetrically about said first position, in a half of the rim centered about the first position.

5. The rim according to claim 2, wherein said at least one localized mass increase further comprises a second localized mass increase, less than said first localized mass increase and arranged at a second position in an intraspoke zone substantially diametrically opposite the first position.

6. The rim according to claim 3, wherein said at least one localized mass increase further comprises a second localized mass increase, less than said first localized mass increase and arranged at a second position in an intraspoke zone substantially diametrically opposite the first position.

7. The rim according to claim 1, wherein said at least one localized mass increase comprises a first localized mass increase at a first position and a second localized mass increase, less than said first localized mass increase and arranged at a second position in an intraspoke zone that is not diametrically opposite the first position, and said second sub-set comprises an intraspoke zone arranged on the same side with respect to the second position with respect to the diameter passing through the first position and in a half of the rim centered about the first position.

8. The rim according to claim 7, wherein said second sub-set comprises an intraspoke zone closest to the first position that has the same extent as the intraspoke zone comprising said first localized mass increase.

9. The rim according to claim 8, wherein said second sub-set comprises an intraspoke zone arranged adjacent the first position.

10. The rim according to claim 1, wherein said at least one localized mass increase comprises a first localized mass increase at a first position and a second localized mass increase, less than said first localized mass increase and arranged at a second position, and said second sub-set comprises an intraspoke zone that comprises the first position and an intraspoke zone that comprises the second position.

11. The rim according to claim 1, wherein said at least one localized mass increase comprises a first localized mass increase at a first position and a second localized mass increase, less than said first localized mass increase and arranged at a second position, and said second sub-set comprises at least one pair of intraspoke zones symmetrically arranged about said first position, in a half of the rim centered about the first position, and at least one pair of intraspoke zones symmetrically arranged about said second position, in a half of the rim centered about the second position.

12. The rim according to claim 10, wherein said at least one localized mass increase comprises a first localized mass increase at a first position and a second localized mass increase, smaller than said first localized mass increase and arranged at a second position, and said second sub-set comprises at least one pair of intraspoke zones symmetrically arranged about said first position, in a half of the rim centered about the first position, and at least one pair of intraspoke zones symmetrically arranged about said second position, in a half of the rim centered about the second position.

13. The rim according to claim 1, wherein said second sub-set further comprises at least one group of intraspoke zones, the group being balanced with respect to the rotational axis of the rim.

14. The rim according to claim 13, wherein said at least one group of zones comprises at least one pair of diametrically opposite intraspoke zones.

15. The rim according claim 1, wherein the intraspoke zones of the second sub-set have the same extent.

16. The rim according claim 1, wherein the intraspoke zones of the second sub-set have a different extent.

17. The rim according to claim 1, wherein said second sub-set consists of 1 or 2 intraspoke zones.

18. The rim according to claim 1, wherein said second sub-set comprises all but 1 or 2 of the intraspoke zones.

19. The rim according to claim 1, wherein said second sub-set comprises all but 1 or 2 of the intraspoke zones arranged between groupings of spokes.

20. The rim according to claim 1, wherein all of the intraspoke zones of the second sub-set have a same average wall thickness.

21. The rim according to claim 1, wherein each intraspoke zone of the second sub-set has a symmetric mass distribution.

22. The rim according to claim 1, wherein at least one intraspoke zone of the second sub-set has an asymmetric mass distribution along its extent.

23. The rim according to claim 1, wherein, in each intraspoke zone of the second sub-set, transitions from thicknesses of the adjacent spoke attachment zones have sharp edges.

24. The rim according to claim 1, wherein, in each intraspoke zone of the second sub-set, transitions from thicknesses of the adjacent spoke attachment zones develop along a certain length of the rim.

25. The rim according to claim 1, wherein a reduction in average wall thickness of the intraspoke zones of the second sub-set is in a lower bridge.

26. The rim according to claim 25, wherein said second sub-set comprises an intraspoke zone that comprises a hole for a valve and said zone has a central region comprising the valve hole and two end regions, the central region having a greater wall thickness than the end regions.

27. The rim according to claim 1, wherein said first average wall thickness is equal to an average wall thickness of the spoke attachment zones.

28. The rim according to claim 1, wherein said at least one localized mass increase of the wheel comprises a valve suitable for being coupled with the rim.

29. The rim according to claim 1, wherein said at least one localized mass increase of the wheel comprises a jointing zone of the rim.

30. A spoked bicycle wheel comprising a rim according to claim 1.

31. A spoked bicycle wheel rim, comprising spoke attachment zones, intraspoke zones, a jointing zone in a first intraspoke zone, and a hole for a valve in a second intraspoke zone diametrically opposed said first intraspoke zone, wherein each zone has an average wall thickness equal to a volume of material of the rim in the zone, divided by a length of the zone, wherein the average wall thickness of said second intraspoke zone is lower than the average wall thicknesses of the remaining intraspoke zones and spoke attachment zones.

32. A spoked bicycle wheel rim, comprising spoke attachment zones, intraspoke zones, a jointing zone in a first intraspoke zone, and a hole for a valve in a second intraspoke zone diametrically opposed said first intraspoke zone, wherein each zone has an average wall thickness equal to a volume of material of the rim in the zone, divided by a length of the zone, and wherein the average wall thickness of said first intraspoke zone is lower than the average wall thicknesses of the remaining intraspoke zones and spoke attachment zones.

33. A spoked bicycle wheel rim, comprising spoke attachment zones, intraspoke zones, a jointing zone in a first intraspoke zone, and a hole for a valve in a second intraspoke zone diametrically opposed said first intraspoke zone, wherein each zone has an average wall thickness equal to a volume of material of the rim in the zone, divided by a length of the zone, and wherein the average wall thickness of two intraspoke zones adjacent said first intraspoke zone is lower than the average wall thicknesses of the remaining intraspoke zones and spoke attachment zones.

34. A spoked bicycle wheel rim, comprising spoke attachment zones, intraspoke zones, a jointing zone in a first intraspoke zone, and a hole for a valve in a second intraspoke zone not diametrically opposed said first intraspoke zone, wherein each zone has an average wall thickness equal to a volume of material of the rim in the zone, divided by a length of the zone, and wherein the average wall thickness of an intraspoke zone adjacent said second intraspoke zone is lower than the average wall thicknesses of the remaining intraspoke zones and spoke attachment zones.

35. A spoked bicycle wheel composite rim made of a fibrous material in a matrix of polymeric material, comprising spoke attachment zones, intraspoke zones, and a hole for a valve in a first intraspoke zone, wherein each zone has an average wall thickness equal to a volume of material of the rim in the zone, divided by a length of the zone, and wherein the average wall thickness of the first intraspoke zone is lower than the average wall thicknesses of the remaining intraspoke zones.

36. An annular spoked bicycle wheel rim defining an axial direction and a radial direction, comprising at least one localized mass increase at a first position; a lower bridge having a greater extent along the axial direction than along the radial direction, the lower bridge having spoke attachment zones and intraspoke zones arranged between the spoke attachment zones, wherein each zone has an average wall thickness equal to a volume of material of the rim in the zone, divided by a length of the zone, wherein the intraspoke zones comprise a first sub-set of intraspoke zones each having a first average wall thickness and an intraspoke zone that comprises the first position having an average wall thickness that is made lower than said first average wall thickness by removal of material, said intraspoke zone that comprises the first position being arranged to at least partially compensate for the at least one localized mass increase, and the spoke attachment zones each having an average wall thickness that is not lower than said first average wall thickness.

37. An annular spoked bicycle wheel rim defining an axial direction and a radial direction, comprising at least one localized mass increase at a first position; a lower bridge having a greater extent along the axial direction than along the radial direction, the lower bridge having spoke attachment zones and intraspoke zones between the spoke attachment zones, wherein said intraspoke zones comprise a first sub-set of intraspoke zones having a first average wall thickness and at least one pair of intraspoke zones each having an average wall thickness that is lower than said first average wall thickness and symmetrically arranged about said first position, in a half of the rim centered about the first position.

38. An annular spoked bicycle wheel rim defining an axial direction and a radial direction, comprising a lower bridge having a greater extent along the axial direction than along the radial direction, the lower bridge having spoke attachment zones and intraspoke zones between the spoke attachment zones; at least one localized mass increase at a first position and a second localized mass increase, less than said first localized mass increase and arranged at a second position in an intraspoke zone substantially diametrically opposite the first position; wherein said intraspoke zones comprise a first sub-set of intraspoke zones having a first average wall thickness and at least one pair of intraspoke zones each having an average wall thickness that is lower than said first average wall thickness and symmetrically arranged about said first position, in a half of the rim centered about the first position.

39. An annular spoked bicycle wheel rim defining an axial direction and a radial direction, comprising a lower bridge having a greater extent along the axial direction than along the radial direction, the lower bridge having spoke attachment zones and intraspoke zones between the spoke attachment zones; and a first localized mass increase at a first position and a second localized mass increase, less than the first localized mass increase, located at a second position in an intraspoke zone that is not diametrically opposite the first position; wherein said intraspoke zones comprise a first sub-set of intraspoke zones having a first average wall thickness and an intraspoke zone having an average wall thickness less than said first average wall thickness arranged on the same side as the second position with respect to a diameter passing through the first position and in a half of the rim centered about the first position.

40. An annular spoked bicycle wheel rim defining an axial direction and a radial direction, comprising a lower bridge having a greater extent along the axial direction than along the radial direction, the lower bridge having spoke attachment zones and intraspoke zones between the spoke attachment zones; and a first localized mass increase at a first position and a second localized mass increase at a second position; wherein said intraspoke zones comprise a first sub-set of intraspoke zones having a first average wall thickness, an intraspoke zone having an average wall thickness less than said first average wall thickness comprising the first position, and an intraspoke zone having an average wall thickness less than said first average wall thickness comprising the second position.

41. An annular spoked bicycle wheel rim defining an axial direction and a radial direction, comprising a lower bridge having a greater extent along the axial direction than along the radial direction, the lower bridge having spoke attachment zones and intraspoke zones between the spoke attachment zones; and a first localized mass increase at a first position and a second localized mass increase at a second position; wherein said intraspoke zones comprise a first sub-set of intraspoke zones having a first average wall thickness, at least one first pair of intraspoke zones each having an average wall thickness that is lower than said first average wall thickness symmetrically arranged about said first position, in a half of the rim centered about the first position, and at least one second pair of intraspoke zones each having an average wall thickness that is lower than said first average wall thickness symmetrically arranged about said second position, in a half of the rim centered about the second position.

42. A spoked bicycle wheel comprising a rim, a hub, and removable spoke connections between the rim and the hub, wherein the rim has spoke attachment zones and intraspoke zones, wherein said intraspoke zones comprise a first sub-set of intraspoke zones each having a first average wall thickness and a second sub-set of intraspoke zones, each intraspoke zone of the second sub-set having an average wall thickness that is lower than said first average wall thickness, said intraspoke zones of the second sub-set being arranged to at least partially compensate for at least one localized mass increase of the wheel through removal of material from said intraspoke zones of the second sub-set, and the spoke attachment zones each have an average wall thickness that is not lower than said first average wall thickness.

43. A rim of a spoked bicycle wheel, comprising a plurality of annular walls consisting of opposite side walls, a lower bridge connecting the side walls and an upper bridge connecting the side walls, at least one of the plurality of annular walls comprising spoke attachment zones and intraspoke zones, wherein said intraspoke zones comprise a first sub-set of intraspoke zones each having a first average wall thickness and a second sub-set of intraspoke zones, each intraspoke zone of the second sub-set having an average wall thickness that is lower than said first average wall thickness, said intraspoke zones of the second sub-set being arranged to at least partially compensate for at least one localized mass increase of the wheel through removal of material from said intraspoke zones of the second sub-set, and the spoke attachment zones each have an average wall thickness that is not lower than said first average wall thickness.

44. A rim of a spoked bicycle wheel, comprising spoke attachment zones and intraspoke zones that each extend between adjacent spoke attachment zones, wherein said intraspoke zones comprise a first sub-set of intraspoke zones having a first average wall thickness and a second sub-set of intraspoke zones, each intraspoke zone of the second sub-set having a wall thickness that is lower than said first average wall thickness along an entire length of said each intraspoke zone of the second sub-set, said intraspoke zones of the second sub-set being arranged to at least partially compensate for at least one localized mass increase of the wheel through removal of material from said intraspoke zones of the second sub-set, and the spoke attachment zones each have an average wall thickness that is not lower than said first average wall thickness.

45. A one-piece composite rim of a spoked bicycle wheel made of a fibrous material in a matrix of polymeric material, comprising spoke attachment zones having holed seats for removable spoke connections, and intraspoke zones, wherein said intraspoke zones comprise a first sub-set of intraspoke zones having a first average wall thickness and a second sub-set of intraspoke zones, each intraspoke zone of the second sub-set having an average wall thickness that is lower than said first average wall thickness, said intraspoke zones of the second sub-set being arranged to at least partially compensate for a valve of the wheel.

46. A spoked bicycle wheel comprising a rim, a hub, and removable spoke connections between the rim and the hub, wherein the rim consists of an extruded and calendared rod subjected to an operation of removal of material, and having two ends and a jointing zone at the ends of the rod, the rod comprising spoke attachment zones and intraspoke zones, wherein said intraspoke zones comprise a first sub-set of intraspoke zones having a first average wall thickness and a second sub-set of intraspoke zones, each intraspoke zone of the second sub-set having an average wall thickness that is lower than said first average wall thickness, said intraspoke zones of the second sub-set being arranged to at least partially compensate for at least one localized mass increase of the wheel.

47. A spoked bicycle wheel comprising a rim, a hub, and removable spoke connections between the rim and the hub, wherein the rim has spoke attachment zones and intraspoke zones, wherein said intraspoke zones comprise a first sub-set of intraspoke zones having a first average wall thickness and a second sub-set of intraspoke zones, each intraspoke zone of the second sub-set having an average wall thickness that is made lower than said first average wall thickness by removal of material, said intraspoke zones of the second sub-set being arranged to at least partially compensate for at least one localized mass increase of the wheel, and the spoke attachment zones each have an average wall thickness that is not lower than said first average wall thickness.

48. A rim of a spoked bicycle wheel, comprising spoke attachment zones and intraspoke zones, wherein said intraspoke zones comprise a first sub-set of intraspoke zones having a first mass and a second sub-set of intraspoke zones, each intraspoke zone of the second sub-set having a mass that is lower than said first mass by a mass reduction, said intraspoke zones of the second sub-set being arranged so that a resultant of forces acting in the wheel in dynamic conditions is minimized or zeroed, wherein said resultant of forces is a vector sum of:
- at least one force having a magnitude expressed by a product of a localized mass increase of the wheel, a squared angular speed of the wheel, and a distance from a center of the rim and a center of mass of the localized mass increase, and of either:
  - a force for each intraspoke zone of the second sub-set, having a magnitude expressed by a product of the mass reduction of said each intraspoke zone of the second sub-set, a squared angular speed of the wheel, and a distance from a center of the rim and a center of mass of said each intraspoke zone of the second sub-set, or
  - a force for each intraspoke zone of the first sub-set, having a magnitude expressed by a product of an additional mass equal and opposite to the mass reduction, a squared angular speed of the wheel, and a distance from a center of the rim and a center of mass of said each intraspoke zone of the first sub-set.

* * * * *

UNITED STATES PATENT AND TRADEMARK OFFICE
CERTIFICATE OF CORRECTION

| | | |
|---|---|---|
| PATENT NO. | : 8,007,052 B2 | Page 1 of 1 |
| APPLICATION NO. | : 11/216611 | |
| DATED | : August 30, 2011 | |
| INVENTOR(S) | : Passarotto et al. | |

It is certified that error appears in the above-identified patent and that said Letters Patent is hereby corrected as shown below:

On the title page, at section (73), line 1, after the word "S.R.L.," delete "Vicena" and insert therefor --Vicenza--.

At column 8, line 24, after the word "formula", delete "(I)" and insert therefor --(1)--.

At column 8, line 29, after the word "formula", delete "(I)" and insert therefor --(1)--.

At column 9, line 44, after the word "formula", delete "(II)" and insert therefor --(11)--.

At column 12, line 43, after the word "formula", delete "(I)" and insert therefor --(1)--.

In claim 1, at column 18, line 15, after the words "first average wall thickness", delete "removal" and insert therefor --by removal--.

Signed and Sealed this
Twenty-seventh Day of December, 2011

David J. Kappos
*Director of the United States Patent and Trademark Office*